United States Patent
Kumazaki et al.

(10) Patent No.: US 8,272,213 B2
(45) Date of Patent: Sep. 25, 2012

(54) HYDRAULIC CONTROL DEVICE FOR VEHICULAR HYDRAULIC CONTROL CIRCUIT

(75) Inventors: Kenta Kumazaki, Toyota (JP); Tooru Matsubara, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1056 days.

(21) Appl. No.: 12/230,739

(22) Filed: Sep. 4, 2008

(65) Prior Publication Data

US 2009/0071142 A1 Mar. 19, 2009

(30) Foreign Application Priority Data

Sep. 14, 2007 (JP) ................................ 2007-238975

(51) Int. Cl.
*F16D 31/02* (2006.01)
(52) U.S. Cl. ........................................................ 60/428
(58) Field of Classification Search .................... 60/428, 60/429, 431, 486
See application file for complete search history.

(56) References Cited

U.S. PATENT DOCUMENTS

2008/0135314 A1 6/2008 Motoike et al.

FOREIGN PATENT DOCUMENTS

| JP | A-2003-307271 | 10/2003 |
| JP | A-2004-215360 | 7/2004 |
| JP | A-2006-067640 | 3/2006 |
| JP | A-2006-183687 | 7/2006 |
| JP | A-2006-288141 | 10/2006 |
| WO | WO 2006115009 A1 * | 11/2006 |

OTHER PUBLICATIONS

Office Action issued in Japanese Application No. 2007-238975 dated Nov. 15, 2011 (with translation).

* cited by examiner

*Primary Examiner* — Michael Leslie
(74) *Attorney, Agent, or Firm* — Oliff & Berridge, PLC

(57) ABSTRACT

In a vehicular hydraulic control circuit equipped with a mechanically-operated oil pump and an electrically-operated oil pump, a hydraulic control device is provided for reducing a high load imposed on the electrically-operated oil pump, when the electrically-operated oil pump is started during stoppage of the mechanically-operated oil pump. When the electrically-operated oil pump (72) is started from a state in which both the mechanically-operated oil pump (70) and the electrically-operated oil pump (72) are stopped, the mechanically-operated oil pump (70) is pre-started, and then the electrically-operated oil pump (72) is started. Therefore, oil pressure pre-generated by the mechanically-operated oil pump (70) can reduce a load imposed on the electrically-operated oil pump (72). As a result, excessive current that may occur in a control circuit for the electrically-operated oil pump (72) can be prevented.

8 Claims, 9 Drawing Sheets

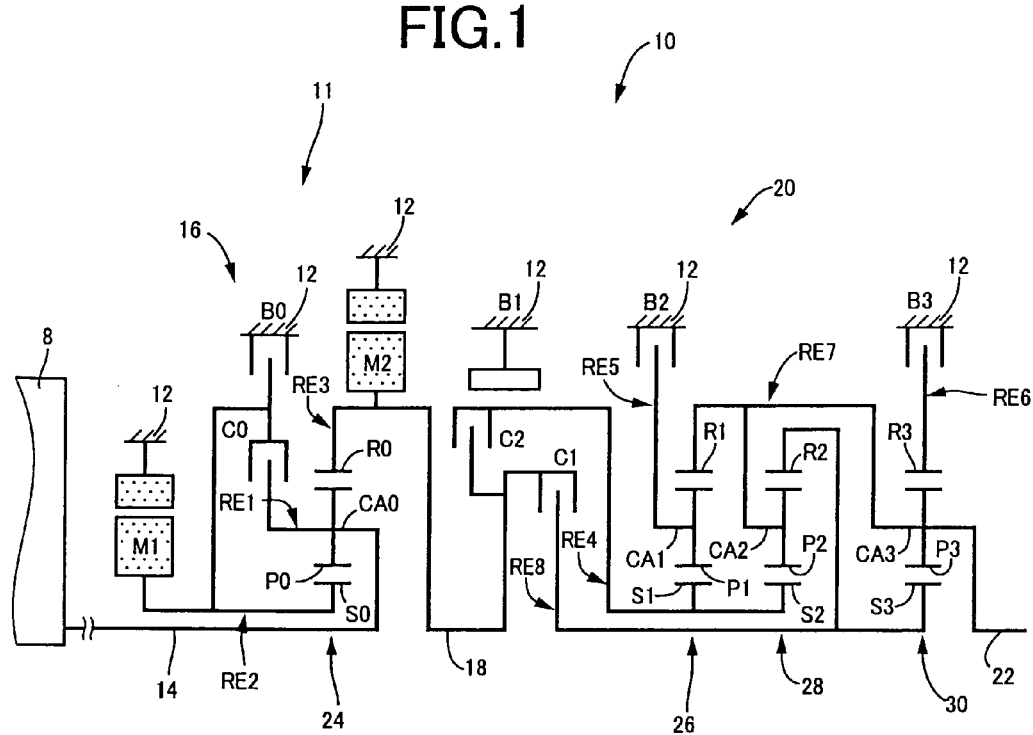

HYDRAULIC CONTROL DEVICE FOR VEHICULAR HYDRAULIC CONTROL CIRCUIT

TECHNICAL FIELD

The present invention relates to a hydraulic control device for vehicular hydraulic control circuit that supplies an oil pressure necessary to, for example, a hydraulic actuator driven by the oil pressure of a vehicle. The vehicular hydraulic control circuit includes a mechanically-operated oil pump and an electrically-operated oil pump.

BACKGROUND ART

To a hydraulic actuator constructing a speed change clutch provided in a vehicular automatic transmission and driven by an oil pressure, a suitable oil pressure regulated by a hydraulic control device is supplied. The oil pressure pumped up by, for example, a mechanically-operated oil pump is supplied to the hydraulic actuator as an initial pressure.

A hydraulic control device for vehicular hydraulic control circuit has been known which includes a mechanically-operated oil pump and an electrically-operated oil pump to suitably drive these oil pumps in accordance with the running state of the vehicle. For example, a hydraulic control device disclosed in Patent Literature 1 (Japanese Patent Publication No. 2003-307271A) is one example thereof. The vehicular hydraulic control circuit disclosed in Patent Literature 1 includes an electrically-operated oil pump and a mechanically-operated oil pump which are connected to an internal combustion engine to be driven by it in an interlocking manner.

For example, since the mechanically-operated oil pump is held in a non-driven state during non-operation of the internal combustion engine, the electrically-operated oil pump is driven to supply an oil pressure. Additionally, Patent Literature 1 discloses a technique for increasing a target rotation speed of an oil pump motor that drives the electrically-operated oil pump in accordance with the running state of the vehicle, thus quickly starting up the oil pressure.

By the way, in the hydraulic control device for vehicular hydraulic control circuit disclosed in the Patent Literature 1 and the like, when the electrically-operated oil pump is rapidly rotated during non-operation of the internal combustion engine, a load imposed on the electrically-operated oil pump may momentarily increase. This is caused by, for example, the operating resistance of a valve, such as a pressure regulating valve, disposed downstream the electrically-operated oil pump. Especially, when the operation oil is low in temperature due to large viscosity thereof, a load imposed on the electrically-operated oil pump may greatly increase. As a result, there has been a fear that excessive current will be generated in an electronic control circuit that controls electric power supplied to the electrically-operated oil pump.

SUMMARY OF THE INVENTION

The present invention has been made in consideration of these circumstances, and has an object, for the vehicular hydraulic control circuit that includes a mechanically-operated oil pump and an electrically-operated oil pump, to provide a hydraulic control device which can reduce the high load imposed on the electrically-operated oil pump which is started during non-operation of the mechanically-operated oil pump.

For achieving the above object, a first aspect of the invention relates to a hydraulic control device for vehicular hydraulic control circuit, wherein (a) the vehicular hydraulic control circuit includes a mechanically-operated oil pump and an electrically-operated oil pump; and (b) the hydraulic control device includes an oil pump control portion that operates, when the electrically-operated oil pump is started from a state in which both the mechanically-operated oil pump and the electrically-operated oil pump are stopped, to pre-starts the mechanically-operated oil pump and then to start the electrically-operated oil pump.

A second aspect of the invention is featured by that the mechanically-operated oil pump is connected to an internal combustion engine provided in a vehicle to be driven in association with the internal combustion engine.

A third aspect of the invention is featured by that the vehicle further includes an electrically-operated differential portion in which a differential state of rotary elements of a differential mechanism is controlled by controlling an operational state of an electric motor connected to the rotary element, the internal combustion engine is connected to the electrically-operated differential portion in a power transmissive state, and the oil pump control means operates to control the electric motor to increase a rotation speed of the internal combustion engine for thereby driving the mechanically-operated oil pump.

A fourth aspect of the invention is featured by that an oil pressure generated by the mechanically-operated oil pump and an oil pressure generated by the electrically-operated oil pump are both supplied to common variable load means.

A fifth aspect of the invention is featured by that the variable load means is a regulator valve.

According to the hydraulic control device for vehicular hydraulic control circuit of the first aspect of the present invention, when the electrically-operated oil pump is started from a state in which both the mechanically-operated oil pump and the electrically-operated oil pump are stopped, the mechanically-operated oil pump is pre-started, and then the electrically-operated oil pump is started. Therefore, an oil pressure pre-generated by the mechanically-operated oil pump can reduce the load imposed on the electrically-operated oil pump. Accordingly, excessive current that may occur in the control circuit of the electrically-operated oil pump can be prevented.

According to the hydraulic control device for vehicular hydraulic control circuit of the second aspect of the present invention, the mechanically-operated oil pump is connected to the internal combustion engine provided in the vehicle to be driven in association with the internal combustion engine. Therefore, the mechanically-operated oil pump is stopped during stoppage of the internal combustion engine. However, driving the electrically-operated oil pump at this time can supply a necessary oil pressure even during stoppage of the internal combustion engine. Additionally, connecting the mechanically-operated oil pump to the internal combustion engine can avoid necessity to additionally dispose a power source for driving the mechanically-operated oil pump. Thus, an increase in the number of components can be avoided.

According to the hydraulic control device for vehicular hydraulic control circuit of the third aspect of the present invention, the internal combustion engine is connected to the electrically-operated differential portion in a power transmissive state, and the oil pump control means operates to control the electric motor to increase a rotation speed of the internal combustion engine for thereby driving the mechanically-operated oil pump. Therefore, the mechanically-operated oil pump can be driven without driving the internal combustion engine, resulting in prevention of fuel consumption by the internal combustion engine. Additionally, the mechanically-operated oil pump can be promptly started by the electric motor.

According to the hydraulic control device for vehicular hydraulic control circuit of the fourth aspect of the present invention, the oil pressure generated by the mechanically-operated oil pump and the oil pressure generated by the electrically-operated oil pump are supplied to the common variable load means shared by two oil pumps. Therefore, either of these two oil pumps can drive the variable load means. Therefore, driving the variable load means by use of the mechanically-operated oil pump before starting the electrically-operated oil pump can reduce the load imposed on the electrically-operated oil pump.

According to the hydraulic control device for vehicular hydraulic control circuit of the fifth aspect of the present invention, the variable load means is a regulator valve. Therefore, driving the regulator valve can suitably regulate the oil pressure supplied to the oil hydraulic circuit.

BRIEF DESCRIPTION OF THE DRAWINGS

FIG. 1 is a skeleton view explaining a structure of a hybrid vehicle drive apparatus which is one of embodiments of the present invention.

FIG. 2 is an engagement operation table illustrating the relationship between a shifting operation, in which the hybrid vehicle drive apparatus, shown in FIG. 1, is placed in a continuously variable or step-variable shifting state, and the operation of a hydraulic-type frictional engaging device in combination.

BEST MODE FOR CARRYING OUT THE INVENTION

Figure 3:
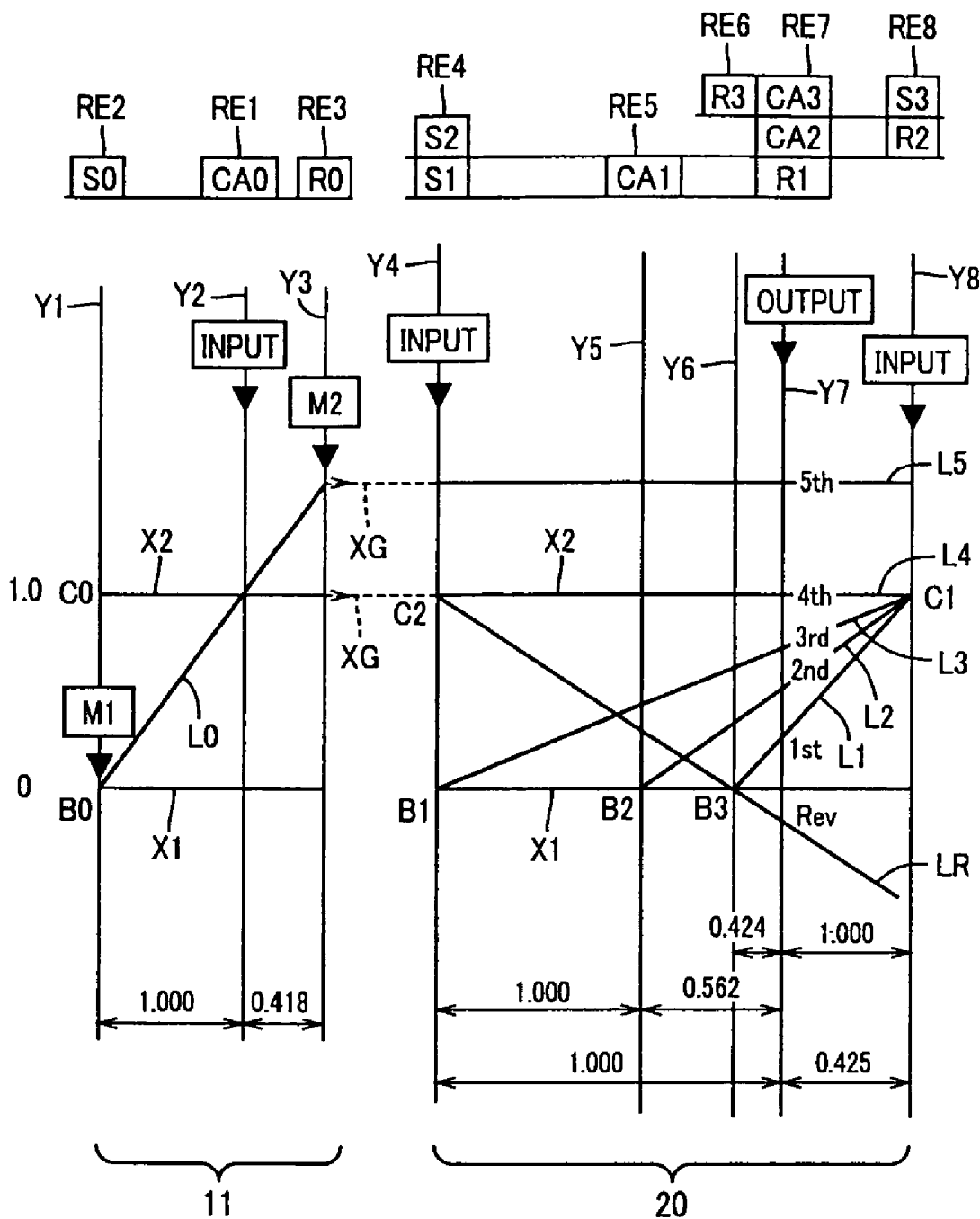
FIG. 3 is a collinear chart illustrating the relative rotation speed of rotary elements in each of different gear positions when the hybrid vehicle drive apparatus, shown in FIG. 1, is caused to operate in the step-variable shifting state.

Herein, preferably, the oil pump control means actuates, by pre-driving the mechanically-operated oil pump, the regulator valve that is disposed downstream the oil pump and that regulates the oil pressure of operation oil discharged from the oil pump. This structure can reduce the load imposed on the electrically-operated oil pump upon starting thereof, so that excessive current being generated in the electronic control circuit of the electrically-operated oil pump can be reduced.

Additionally, preferably, the electrically-operated differential portion is comprised of a planetary gear unit and two electric motors. Thanks to this structure, each of the rotary elements of the planetary gear unit can be controlled by the two electric motors, so that the rotation speed of the rotary element connected to the internal combustion engine can be increased by controlling the electric motors. Additionally, the electrically-operated differential portion comprised of the planetary gear unit can be made comparatively compact in the structure thereof.

Now, various embodiments of the present invention will be described below in detail with reference to accompanying drawings.

Embodiment

FIG. 1 is a skeleton view illustrating a shifting mechanism 10, forming part of a power transmitting apparatus for a hybrid vehicle, to which a control device of one embodiment according to the present invention is applied. As shown in FIG. 1, the shifting mechanism 10 includes an input shaft 14 serving as an input rotary member, a differential portion 11 directly connected to the input shaft 14 or indirectly connected thereto through a pulsation absorbing damper (vibration damping device) not shown, an automatic shifting portion i.e. automatic transmission 20 connected via a power transmitting member (as an output shaft of differential mechanism) 18 in series through a power transmitting path between the differential mechanism 11 and drive wheels 38 (see FIG. 6) to serve as a step-variable type transmission, and an output shaft 22 connected to the automatic shifting portion 20 as an output rotary member, all of which are disposed in a transmission casing 12 (hereinafter briefly referred to as a "casing 12") serving as a non-rotary member connectedly mounted on a vehicle body.

Figure 6:
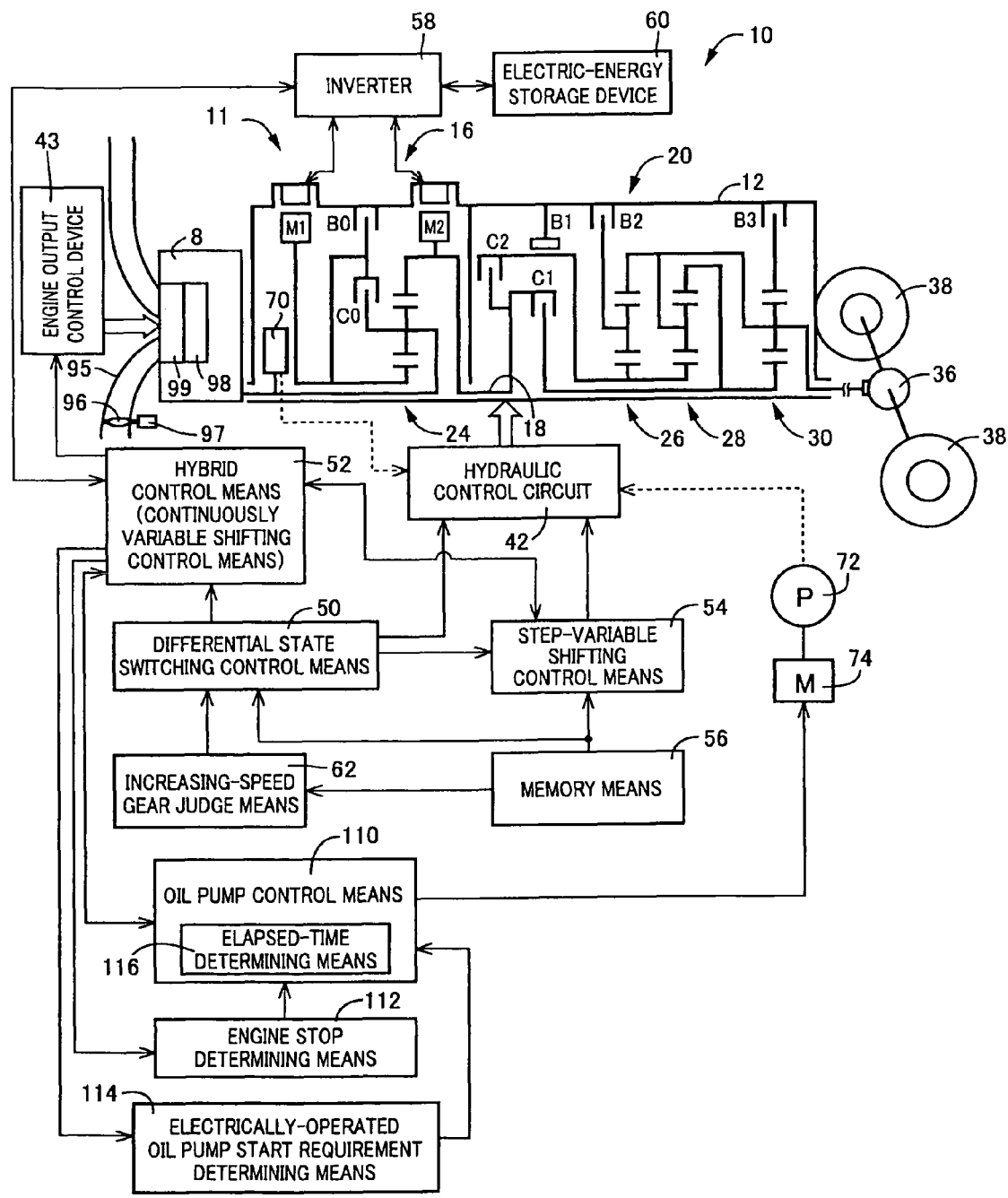
FIG. 6 is a functional block diagram illustrating a major control operation to be executed by the electronic control device shown in FIG. 4.

The shifting mechanism 10, preferably applicable to a vehicle of FR type (front-engine rear-drive type), is disposed between a longitudinally mounted engine 8, i.e., an internal combustion engine such as a gasoline engine or a diesel engine serving as a drive force directly connected to the input shaft 14 or indirectly connected thereto via the pulsation absorbing damper, and a pair of drive wheels 38 (FIG. 6). This allows a vehicle drive force to be transmitted to the pair of drive wheels 38 on left and right in sequence through a differential gear device 36 (final speed reduction gear) and a pair of drive axles. Further, in present embodiment, the engine 8 corresponds to an internal combustion engine and the differential portion 11 corresponds to an electrically operated differential portion of the present invention.

With the shifting mechanism 10 of the present embodiment, the engine 8 and the differential portion 11 are connected to each other in a direct connection. As used herein, the term "direct connection" may refer to a connection, established without intervening any fluid-type transmitting device such as a torque converter or a fluid coupling, which involves a connection established with the use of the vibration damping device. Upper and lower halves of the shifting mechanism 10 are structured in symmetric relation with respect to an axis of the shifting mechanism 10 and, hence, the lower half is omitted in the skeleton view of FIG. 1.

The differential portion 11 includes a first electric motor M1, a power distributing mechanism 16 (a differential-portion planetary gear unit 24) which is a mechanical mechanism to distribute the output of the engine 8 input to the input shaft 14 mechanically, and which distributes the output of the engine 8 to the first electric motor M1 and the power transmitting member 18, and a second electric motor M2 unitarily rotatable with the power transmitting member 18.

Further, the second electric motor M2 may be disposed at any portion of the power transmitting path extending from the power transmitting member 18 to the drive wheels 38. Moreover, the first and second electric motors M1 and M2 are so-called motor/generators each having a function even as an electric power generator. The first electric motor M1 has at least one function as an electric power generator that generates a reactive force, and the second electric motor M2 has at least a function as an electric motor serving as a drive force source to generate a drive force to run the vehicle.

The power distributing mechanism 16, corresponding to the differential mechanism of the present invention, mainly includes a differential-portion planetary gear unit 24 of a single pinion type having a given gear ratio $\rho 0$ of, for instance, about "0.418", a switching clutch C0 and a switching brake B0. The differential-portion planetary gear unit 24 includes rotary elements, such as a differential-portion sun gear S0, a differential-portion planetary gears P0, a differential-portion carrier CA0 supporting the differential-portion planetary gears P0 to be rotatable about its axis and about the axis of the differential-portion sun gear S0, and a differential-portion ring gear R0 meshing with the differential-portion sun gear S0 through the differential-portion planetary gears P0. With the differential-portion sun gear S0 and the differential-portion ring gear R0 assigned to have the numbers of teeth represented by ZS0 and ZR0, respectively, the gear ratio $\rho 0$ is expressed as ZS0/ZR0.

With the power distributing mechanism 16 of such a structure, the differential-portion carrier CA0 is connected to the input shaft 14, i.e., to the engine 8; the differential-portion sun gear S0 is connected to the first electric motor M1; and the differential-portion ring gear R0 is connected to the power transmitting member 18. The switching brake B0 is disposed between the differential-portion sun gear S0 and the casing 12, and the switching clutch C0 is disposed between the differential-portion sun gear S0 and the differential-portion carrier CA0. With both the switching clutch C0 and the switching brake B0 being disengaged, the power distributing mechanism 16 is rendered operative such that the differential-portion sun gear S0, the differential-portion carrier CA0 and the differential-portion ring gear R0, forming the three elements of the differential-portion planetary gear unit 24, are caused to rotate relative to each other to enable the operation in a differential action, i.e., in a differential state under which the differential action is effectuated.

Thus, the output of the engine 8 is distributed to the first electric motor M1 and the power transmitting member 18 with a part of the engine output distributed to the first electric motor M1 being used to generate electric energy to be stored in a battery or to drivably rotate the second electric motor M2. This renders the differential portion 11 (power distributing mechanism 16) operative as an electrically controlled differential device. Thus, the differential portion 11 is placed in a so-called continuously variable shifting state (electrically controlled CVT state), in which a rotation speed of the power transmitting member 18 varies in a continuous fashion regardless of the engine 8 operating at a given rotation speed.

That is, as the power distributing mechanism 16 is placed in the differential state, the differential portion 11 is also placed in differential state. In this casing, the differential portion 11 is placed in the continuously variable shifting state to operate as the electrically controlled continuously variable transmission with a speed ratio $\gamma 0$ (a ratio of rotation speed $N_{IN}$ of the driving device input shaft 14 to the rotation speed $N_{18}$ of the power transmitting member 18) continuously varying in a value ranging from a minimum value $\gamma 0min$ to a maximum value $\gamma 0max$. By controlling a drive state of the first electric motor M1 and the second electric motor M2 which are respectively connected to differential-portion sun gear S0 and to differential-portion ring gear R0, the differential states of each rotary elements of the differential portion 11 are controlled.

Under such a state, as the switching clutch C0 or the switching brake B0 is engaged, the power distributing mechanism 16 is disenabled to perform the differential action, i.e., placed in a non-differential state in which no differential action is effectuated. In particular, as the switching clutch C0 to function as a locking mechanism in the present invention is engaged to cause the differential-portion sun gear S0 and the differential-portion carrier CA0 to be unitarily coupled to each other, the power distributing mechanism 16 is placed in a locked state under which the differential-portion sun gear S0, the differential-portion carrier CA0 and the differential-portion ring gear R0, serving as the three elements of the differential-portion planetary gear unit 24, are caused to rotate together, i.e., in a unitarily rotating state under the non-differential state in which no differential action is effectuated. Thus, the differential portion 11 is placed in the non-differential state. Therefore, the rotation speeds of the engine 8 and the power transmitting member 18 coincide with each other, so that the differential portion 11 (power distributing mechanism 16) is placed in a fixed shifting state, i.e., a step-variable shifting state to function as a transmission with the speed ratio $\gamma 0$ connected to a value of "1".

Instead of the switching clutch C0, next, if the switching brake B0 is engaged to connect the differential-portion sun gear S0 to the casing 12, then, the power distributing mechanism 16 is placed in the locked state. Thus, the differential-portion sun gear S0 is placed in the non-rotating state under the non-differential state in which no differential action is initiated, causing the differential portion 11 to be placed in the non-differential state.

Since the differential-portion ring gear R0 rotates at a speed higher than that of the differential-portion carrier CA0, the power distributing mechanism 16 functions as a speed-increasing mechanism. Thus, the differential portion 11

(power distributing mechanism 16) is placed in the fixed shifting state, i.e., the step-variable shifting state to perform a function as a speed-increasing transmission with the speed ratio γ0 connected to a value smaller than "1", i.e., for example, about 0.7.

With the present embodiment, the switching clutch C0 and the switching brake B0 selectively place the shifting state of differential portion 11 (power distributing mechanism 16) in the differential state, i.e., the unlocked state and the non-differential state, i.e., the locked state. That is, the switching clutch C0 and the switching brake B0 serves as a differential state switching device that selectively switches the differential portion 11 (power distributing mechanism 16) in one of the continuously variable shifting state, operative to perform the electrically and continuously controlled variable shifting operation, under which the differential portion 11 (power distributing mechanism 16) is placed in the differential state (coupled state) to perform the function as the electrically controlled differential device operative to function as the continuously variable transmission with, for instance, the shifting ratio is continuously variable; and the fixed shifting state under which the differential portion 11 (power distributing mechanism 16) is placed in the shifting state, disenabling the function of the electrically controlled continuously variable shifting operation, such as the locked state disenabling the function of the continuously variable transmission in which no continuously variable shifting operation is effectuated with a speed ratio being locked at a connected level.

In the locked state, the differential portion 11 (power distributing mechanism 16) is rendered operative as a transmission of a single-stage or a multi-stage with a speed ratio of one kind or speed ratios of more than two kinds to function in the fixed shifting state (non-differential state), disenabling the electrically controlled continuously variable shifting operation, under which the differential portion 11 (power distributing mechanism 16) operates as the transmission of the single-stage or the multi-stage with the speed ratio kept at a connected level.

The automatic shifting portion 20 structures a part of a power transmitting path between the differential portion 11 (transmitting member 18) and the drive wheels 38, and includes a first planetary gear unit 26 of a single-pinion type, a second planetary gear unit 28 of a single-pinion type and a third planetary gear unit 30 of a single-pinion type. The first planetary gear unit 26 includes a first sun gear S1, first planetary gears P1, a first carrier CA1 supporting the first planetary gears P1 to be rotatable about its axis and about the axis of the first sun gear S1, and a first differential-portion ring gear R1 meshing with the first sun gear S1 via the first planetary gears P1, having a gear ratio ρ1 of, for instance, about "0.562". The second planetary gear unit 28 includes a second sun gear S2, second planetary gears P2, a second carrier CA2 supporting the second planetary gears P2 to be rotatable about its axis and about the axis of the second sun gear S2, and a second ring gear R2 meshing with the second sun gear S2 via the second planetary gears P2, having a gear ratio ρ2 of, for instance, about "0.425".

The third planetary gear unit 30 includes a third sun gear S3, third planetary gears P3, a third carrier CA3 supporting the third planetary gears P3 to be rotatable about its axis and about the axis of the third sun gear S3, and the third ring gear R3 meshing with the third sun gear S3 through the third planetary gears P3, having a gear ratio ρ3 of, for instance, about "0.421". With the first sun gear S1, the first ring gear R1, the second sun gear S2, the second ring gear R2, the third sun gear S3 and the third ring gear R3 assigned to have the numbers of teeth represented by ZS1, ZR1, ZS2, ZR2, ZS3 and ZR3, respectively, the gear ratios ρ1, ρ2 and ρ3 are represented by ZS1/ZR1, ZS2/ZR2, and ZS3/ZR3, respectively.

With the automatic shifting portion 20, the first sun gear S1 and the second sun gear S2 are integrally connected to each other and selectively connected to the power transmitting member 18 through a second clutch C2 while selectively connected to the casing 12 through a first brake B1. The first carrier CA1 is selectively connected to the casing 12 through a second brake B2 and the third ring gear R3 is selectively connected to the casing 12 through a third brake B3. The first ring gear R1, the second carrier CA2 and the third carrier CA3 are integrally connected to each other and also connected to the output shaft 22. The second ring gear R2 and the third sun gear S3 are integrally connected to each other and selectively connected to the power transmitting member 18 through the first clutch C1.

Thus, the automatic shifting portion 20 and the power transmitting member 18 are selectively connected to each other through the first clutch C1 or the second clutch C2 used for establishing a gear shift position in the automatic shifting portion 20. In other words, the first clutch C1 and the second clutch C2 collectively function as an engaging device for switching the operations of the power transmitting member 18 and the automatic shifting portion 20. That is, such an engaging device selectively switches a power transmitting path between the differential portion 11 (transmitting member 18) and the drive wheels 38 in a power transmitting state, enabling a power transfer through the power transmission path, and a power interrupting state (neutral state) to interrupting the power transfer through the power transmission path. That is, with at least one of the first clutch C1 and the second clutch C2 being engaged, the power transmitting path is placed in the power transmitting state. In contrast, with both the first clutch C1 and the second clutch C2 being disengaged, the power transmitting path is placed in the power interrupting state (neutral state).

The switching clutch C0, the first clutch C1, the second clutch C2, the switching brake B0, the first brake B1, the second brake B2 and the third brake B3 are hydraulic-type frictionally coupling devices used in a vehicular step-variable type automatic transmission of the related art. An example of the frictionally coupling device includes a wet-type multiple-disc type that includes a plurality of superposed friction plates pressed against each other with a hydraulic actuator or a band brake comprised of a rotary drum having an outer circumferential surface on which one band or two bands are wound to be tightened at one ends with a hydraulic actuator to allow associated component parts, between which the rotary drum intervenes, to be selectively connected to each other.

With the shifting mechanism 10 of such a structure, as indicated in an engagement operation table shown FIG. 2, the switching clutch C0, the first clutch C1, the second clutch C2, the switching brake B0, the first brake B1, the second brake B2 and the third brake B3 are selectively engaged in operation. This selectively establishes either one of a 1st-speed gear position (1st-speed gear shift position) to a 5th-speed gear position (5th-speed gear shift position) or one of a reverse-drive gear position (reverse-drive gear shift position) and a neural position with a speed ratios γ (input-shaft rotation speed $N_{IN}$/output-shaft rotation speed $N_{OUT}$) varying in nearly equal ratio for each gear position.

In particular, with the present embodiment, the power distributing mechanism 16 is comprised of the switching clutch C0 and the switching brake B0, either one of which is engaged in operation. This makes it possible to cause the differential portion 11 to be placed in the continuously variable shifting state enabling the operation as the continuously variable transmission while establishing the fixed shifting state enabling the transmission to operate with the speed ratio maintained at a fixed level. With either one of the switching clutch C0 and the switching brake B0 being engaged in operation, accordingly, the differential portion 11 is placed in the fixed shifting state to cooperate with the automatic shifting portion 20 to allow the shifting mechanism 10 to operate as the step-variable transmission placed in the step-variable shifting state. With both of the switching clutch C0 and the switching brake B0 being disengaged in operation, the differential portion 11 is placed in the continuously variable shifting state to cooperate with the automatic shifting portion 20 to allow the shifting mechanism 10 to operate as the electrically controlled continuously variable transmission placed in the continuously variable shifting state. In other words, the shifting mechanism 10 is switched to the step-variable shifting state, upon engagement of either one of the switching clutch C0 and the switching brake B0, and the continuously variable shifting state with both of the switching clutch C0 and the switching brake B0 being brought into disengagement. In addition, it can be said that the differential portion 11 is the transmission that can also be switched to the step-variable shifting state and the continuously variable shifting state.

For example, as shown in FIG. 2, under a circumstance where the shifting mechanism 10 is caused to function as the step-variable transmission, engaging the switching clutch C0, the first clutch C1 and the third brake B3 results in the 1st-speed gear position with the speed ratio $\gamma 1$ having a maximum value of, for instance, about "3.357". Engaging the switching clutch C0, the first clutch C1 and the second brake B2 results in the 2nd-speed gear position with the speed ratio $\gamma 2$ of, for instance, about "2.180", which is lower than that of the 1st-speed gear position. Engaging the switching clutch C0, the first clutch C1 and the first brake B1 results in the 3rd-speed gear position with the speed ratio $\gamma 3$ of, for instance, about "1.424", which is lower than that of the 2nd-speed gear position. Engaging the switching clutch C0, the first clutch C1 and the second clutch C2 results in the 4th-speed gear position with the speed ratio $\gamma 4$ of, for instance, about "1.000", which is lower than that of the 3rd-speed gear position.

With the first clutch C1, the second clutch C2 and the switching brake B0 being engaged, the 5th-speed gear position is established with the speed ratio $\gamma 5$ of, for example, about "0.705", which is smaller than that of the 4th-speed gear position. With the second clutch C2 and the third brake B3 being engaged, further, the reverse-drive gear position is established with the speed ratio $\gamma R$ of, for example, about "3.209", which lies at a value between those of the 1st-speed and 2nd-speed gear positions. For the neutral "N" state to be established, for instance, all the clutches and the brakes C0, C1, C2, B0, B1, B2 and B3 are disengaged.

However, for the shifting mechanism 10 to function as the continuously variable transmission, both the switching clutch C0 and the switching brake B0 are disengaged as indicated in the engagement operation table shown in FIG. 2. With such operation, the differential portion 11 is rendered operative to function as the continuously variable transmission and the automatic shifting portion 20, connected thereto in series, is rendered operative to function as the step-variable transmission. This causes the rotation speed input to the automatic shifting portion 20, i.e., the rotation speed of the power transmitting member 18 to be continuously varied for each of the 1st-speed gear position, the 2nd-speed gear position, the 3rd-speed gear position and the 4th-speed gear position. This allows each of the various gear positions to be established in an infinitely variable shifting ratio. Accordingly, a speed ratio can be continuously variable across the adjacent gear positions, making it possible for the shifting mechanism 10 as a whole to obtain an infinitely variable total speed ratio (overall speed ratio) $\gamma T$.

FIG. 3 shows a collinear chart plotted in straight lines that can represent a correlation among the rotation speeds of the various rotary elements available to accomplish clutch engagement states in different modes depending on the gear positions of the shifting mechanism 10 comprised of the differential portion 11, functioning as the continuously variable shifting portion or the first shifting portion, and the automatic shifting portion 20 functioning as the step-variable shifting portion or the second shifting portion. The collinear chart of FIG. 3 is a two-dimensional coordinate system having the horizontal axis, representing the correlation among the gear ratios $\rho$ established with the planetary gear units 24, 26, 28 and 30, and the vertical axis representing relative rotation speeds of the rotary elements. The lowermost line X1 of three horizontal lines indicates the rotation speed laying at a value of "0". An upper horizontal line X2 indicates the rotation speed laying at a value of "1.0", that is, a rotation speed NE of the engine 8 connected to the input shaft 14. The uppermost horizontal line XG indicates the rotation speed of the power transmitting member 18.

Starting from the left, three vertical lines Y1, Y2 and Y3, corresponding to the three elements of the power distributing mechanism 16 forming the differential portion 11, respectively, represent relative rotation speeds of the differential-portion sun gear S0 corresponding to a second rotary element (second element) RE2, the differential-portion carrier CA0 corresponding to a first rotary element (first element) RE1, and the differential-portion ring gear R0 corresponding to a third rotary element (third element) RE3. A distance between adjacent ones of the vertical lines Y1, Y2 and Y3 is determined in accordance with the gear ratio $\rho 0$ of the differential-portion planetary gear unit 24.

Starting from the left, five vertical lines Y4, Y5, Y6, Y7 and Y8 for the automatic shifting portion 20 represent relative rotation speeds of the first and second sun gears S1 and S2 corresponding to a fourth rotary element (fourth element) RE4 and connected to each other, the first carrier CA1 corresponding to a fifth rotary element (fifth element) RE5, the third ring gear R3 corresponding to a sixth rotary element (sixth element) RE6, the first ring gear R1 and the second and third carriers CA2 and CA3 corresponding to a seventh rotary element (seventh element) RE7 and connected to each other, and the second ring gear R2 and the third sun gear S3 corresponding to an eighth rotary element (eighth element) RE8 and connected to each other, respectively. A distance between the adjacent ones of the vertical lines Y4 to Y8 is determined based on the gear ratios $\rho 1$, $\rho 2$ and $\rho 3$ of the first, second and third planetary gear units 26, 28 and 30.

In the correlation between the vertical lines on the collinear chart, if an interval between the sun gear and the carrier is assigned to a distance corresponding to a value of "1", an interval between the carrier and the ring gear is assigned to a distance corresponding to the gear ratio $\rho$ of the planetary gear unit. That is, for the differential portion 11, an interval between the vertical lines Y1 and Y2 is assigned to a distance corresponding to a value of "1" and an interval between the vertical lines Y2 and Y3 is assigned to a distance corresponding to a value of "$\rho 0$". For each of the first, second and third planetary gear units 26, 28 and 30 of the automatic shifting portion 20, further, an interval between the sun gear and the carrier is assigned to a distance corresponding to a value of "1" and an interval between the carrier and the ring gear is assigned to a distance corresponding to the gear ratio "$\rho$".

Expressing the structure using the collinear chart shown in FIG. 3, the shifting mechanism 10 of the present embodiment takes the form of a structure including the power distributing mechanism 16 (differential portion 11). With the power distributing mechanism 16 (differential portion 11), the differential-portion planetary gear unit 24 has the first rotary element RE1 (differential-portion carrier CA0) connected to the input shaft 14, i.e., the engine 8, while selectively connected to the second rotary element RE2 (differential-portion sun gear S0) through the switching clutch C0, the second rotary element RE2 connected to the first electric motor M1 while selectively connected to the casing 12 through the switching brake B0, and the third rotary element RE3 (differential-portion ring gear R0) connected to the power transmitting member 18 and the second electric motor M2. Thus, the rotation of the input shaft 14 is transmitted (input) to the automatic shifting portion (step-variable shifting portion) 20 through the power transmitting member 18. An inclined straight line L0, passing across an intersecting point between the lines Y2 and X2, represents the correlation between the rotation speeds of the differential-portion sun gear S0 and the differential-portion ring gear R0.

For example, as the switching clutch C0 and the switching brake B0 are disengaged, the shifting mechanism 10 is switched to the continuously variable shifting state (differential state). In this case, controlling the rotation speed of the first electric motor M1 causes the rotation speed of the differential-portion sun gear S0, represented by an intersecting point between the straight line L0 and the vertical line Y1, to increase or decrease. Under such a state, if the rotation speed of the differential-portion ring gear R0, bound with the vehicle speed V, remains at a nearly fixed level, then, the rotation speed of the differential-portion carrier CA0, represented by the intersecting point between the straight line L0 and the vertical line Y2, is caused to increase or decrease.

With the switching clutch C0 being engaged to couple the differential-portion sun gear S0 and the differential-portion carrier CA0 to each other, the power distributing mechanism 16 is brought into the non-differential state where the three rotary elements are caused to integrally rotate as a unitary unit. Thus, the straight line L0 matches the lateral line X2, so that the power transmitting member 18 is caused to rotate at the same rotation speed as the engine rotation speed NE. In contrast, with the switching brake B0 being engaged to halt the rotation of the differential-portion sun gear S0, the power distributing mechanism 16 is brought into the non-differential state to function as the speed-increasing mechanism. Thus, the straight line L0 describes a state as shown in FIG. 3, under which the rotation of the differential-portion ring gear R0, i.e., the power transmitting member 18, represented by an intersecting point between the straight line L0 and the vertical line Y3, is input to the automatic shifting portion 20 at a rotation speed higher than the engine rotation speed NE.

With the automatic shifting portion 20, the fourth rotary element RE4 is selectively connected to the power transmitting member 18 through the second clutch C2 and selectively connected to the casing 12 through the first brake B1. The fifth rotary element RE5 is selectively connected to the casing 12 through the second brake B2 and the sixth rotary element RE6 is selectively connected to the casing 12 through the third brake B3. The seventh rotary element RE7 is connected to the output shaft 22 and the eighth rotary element RE8 is selectively connected to the power transmitting member 18 through the first clutch C1.

As shown in FIG. 3, with the automatic shifting portion 20, upon engagement of the first clutch C1 and the third brake B3, the rotation speed of the output shaft 22 for the 1st-speed gear position is represented by an intersecting point between the inclined straight line L1 and the vertical line Y7 representing the rotation speed of the seventh rotary element RE7 connected to the output shaft 22. Here, the inclined straight line L1 passes across an intersecting point between the vertical line Y8, indicative of the rotation speed of the eighth rotary element RE8, and the horizontal line X2, and an intersecting point between the vertical line Y6, indicative of the rotation speed of the sixth rotary element RE6, and the horizontal line X1.

Similarly, the rotation speed of the output shaft 22 for the 2nd-speed gear position is represented by an intersecting point between an inclined straight line L2, determined upon engagement of the first clutch C1 and the second brake B2, and the vertical line Y7 indicative of the rotation speed of the seventh rotary element RE7 connected to the output shaft 22. The rotation speed of the output shaft 22 for the 3rd-speed gear position is represented by an intersecting point between an inclined straight line L3, determined upon engagement of the first clutch C1 and the first brake B1, and the vertical line Y7 indicative of the rotation speed of the seventh rotary element RE7 connected to the output shaft 22. The rotation speed of the output shaft 22 for the 4th-speed gear position is represented by an intersecting point between a horizontal line L4, determined upon engagement of the first and second clutches C1 and C2, and the vertical line Y7 indicative of the rotation speed of the seventh rotary element RE7 connected to the output shaft 22.

For the 1st-speed to 4th-speed gear positions, the switching clutch C0 remains engaged. Therefore, a drive force is applied from the differential portion 11, i.e., the power distributing mechanism 16 to the eighth rotary element RE8 at the same rotation speed as that of the engine rotation speed NE. However, in place of the switching clutch C0, if the switching clutch B0 is engaged, then, the drive force is applied from the differential portion 11 to the eighth rotary element RE8 at a higher rotation speed than the engine rotation speed NE. Thus, an intersecting point between a horizontal line L5 and the vertical line Y7 represents the rotation speed of the output shaft 22 for the 5th-speed gear position. Here, the horizontal line L5 is determined upon engagement of the first clutch C1, the second clutch C2 and the switching brake B0 and the vertical line Y7 represents the rotation speed of the seventh rotary element RE7 connected to the output shaft 22.

Figure 4:
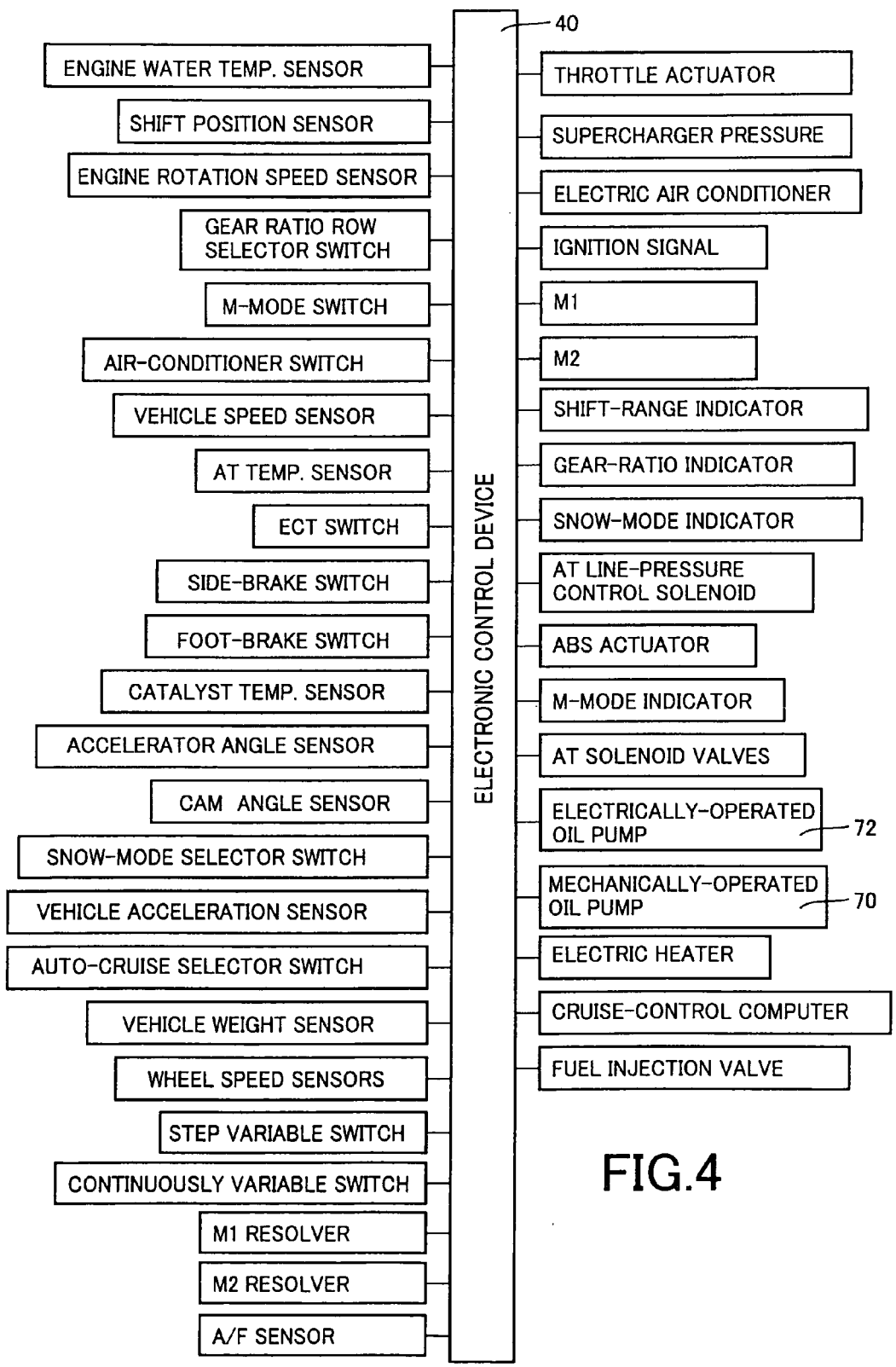
FIG. 4 is a view illustrating input and output signals to be input to or output from an electronic control device incorporated in the drive apparatus shown in FIG. 1.

FIG. 4 exemplarily shows various input signals applied to an electronic control device 40, serving as a control device for controlling the shifting mechanism 10 forming part of the hybrid vehicle drive apparatus according to the present invention, and various output signals delivered from the electronic control device 40. The electronic control device 40 includes a so-called microcomputer incorporating a CPU, a ROM, a RAM and an input/output interface. With the microcomputer operated to perform signal processing according to programs preliminarily stored in the ROM while utilizing a temporary data storage function of the RAM, hybrid drive controls are conducted to control the engine 8 and the first and second electric motors M1 and M2, while executing drive controls such as shifting controls of the automatic shifting portion 20.

The electronic control device 40 is applied with the various input signals from various sensors and switches shown in FIG. 4. These input signals include a signal indicative of an engine cooling water temperature $TEMP_W$, a signal indicative of a selected shift position SP, a signal indicative of a rotation speed $N_{M1}$ of the first electric motor M1, a signal indicative of a rotation speed $N_{M2}$ of the second electric motor M2, a signal indicative of the engine rotation speed NE representing the rotation speed of the engine 8, a signal indicative of a set value of gear ratio row, a signal commanding an M-mode (manually shift drive mode), and an air-conditioning signal indicative of the operation of an air conditioner, etc.

Besides the input signals described above, the electronic control device 40 is further applied with other various input signals. These input signals include a signal indicative of the vehicle speed V corresponding to the rotation speed $N_{OUT}$ of the output shaft 22, a working oil temperature signal indicative of a working oil temperature of the automatic shifting portion 20, a signal indicative of a side brake being operated, a signal indicative of a foot brake being operated, a catalyst temperature signal indicative of a catalyst temperature, an accelerator opening signal indicative of a displacement value $A_{CC}$ of an accelerator pedal corresponding to an output demand value required by a driver, a cam angle signal, a snow mode setting signal indicative of a snow mode being set, an acceleration signal indicative of a fore and aft acceleration of the vehicle, an auto-cruising signal indicative of the vehicle running under an auto-cruising mode, a vehicle weight signal indicative of a weight of the vehicle, a drive wheel velocity signal indicative of a wheel velocity of each drive wheel, a signal indicative of an air-fuel ratio A/F of the engine 8, and a signal indicative of a throttle valve opening $\theta_{TH}$, etc.

The electronic control device 40 generates various control signals to be applied to an engine output control device 43 (refer to FIG. 6) for controlling the engine output. These control signals include, for instance, a drive signal applied to a throttle actuator 97 for controlling an opening degree $\theta_{TH}$ of a throttle valve 96 disposed in an intake manifold 95 of the engine 8, a fuel supply quantity signal to be applied to a fuel injection device 98 for controlling the amount to fuel to be supplied to each cylinder of the engine 8, an ignition signal to be applied to an ignition device 99 for commanding an ignition timing of the engine 8, a supercharger pressure regulating signal for adjusting a supercharger pressure level, an electric air-conditioner drive signal for actuating an electric air conditioner, and command signals for commanding the operations of the first and second electric motors M1 and M2.

Besides the control signals described above, the electronic control device 40 generates various output signals. These output signals include a shift-position (selected operating position) display signal for activating a shift indicator, a gear-ratio display signal for providing a display of the gear ratio, a snow-mode display signal for providing a display of a snow mode under operation, an ABS actuation signal for actuating an ABS actuator for preventing slippages of the drive wheels during a braking effect, an M-mode display signal for displaying the M-mode being selected, valve command signals for actuating electromagnet valves incorporated in a hydraulically operated control circuit 42 (see FIG. 6) to control the hydraulic actuators of the hydraulically operated frictional engaging devices of the differential portion 11 and the automatic shifting portion 20, drive command signals for actuating an electrically operated oil pump 72 serving as a hydraulic pressure source of the hydraulically operated control circuit 42, a signal for driving an electric heater, and signals applied to a cruise-control computer, etc.

Figure 5:
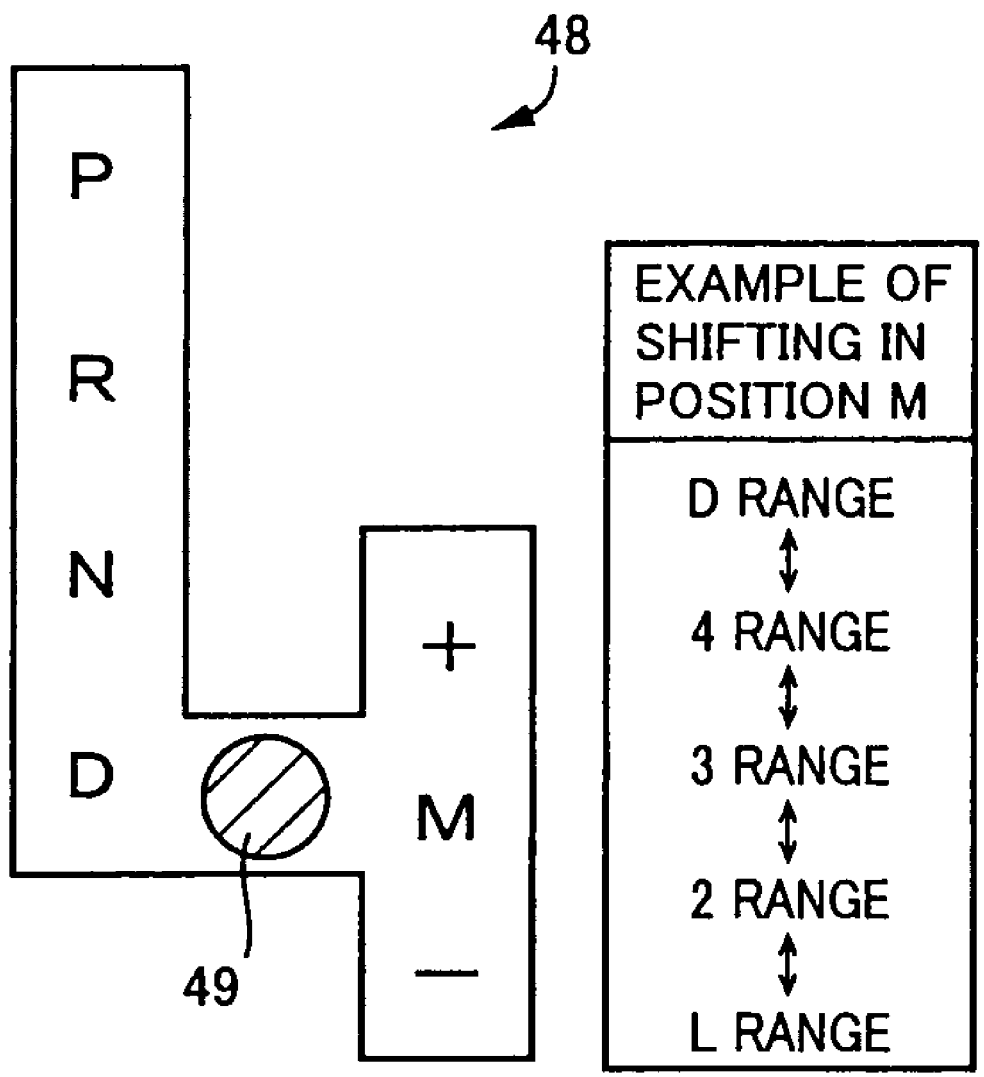
FIG. 5 is a view showing one sample of a shift operating device for operating to select one of plural kinds of shift positions which is manually operated.

FIG. 5 is a view showing one sample of a shift operating device 48, serving as a switching device, which is manually operated to select one of the shift positions SP of multiple kinds. The shift operating device 48 includes a shift lever 49 mounted a side, for example, a driver's seat to be manually operated to select one of the shifting positions SP of the plural kinds.

The shift lever 49 has a structure arranged to be selectively shifted in manual operation to be set to one of a parking position "P" (Parking) under which the shifting mechanism 10, i.e., the automatic shifting portion 20, is placed in the neutral state interrupting the power transmitting path of the shifting mechanism 10, i.e., the automatic shifting portion 20, a reverse drive running position "R" (Reverse) for the vehicle to run in a reverse drive mode, a neutral position "N" (Neutral) for the neutral state to be established under which the power transmitting path of the shifting mechanism 10 is interrupted, a forward drive automatic shift position "D" (Drive) for an automatic shift control to be executed within a varying range of the total speed ratio γT that can be shifted with the shifting mechanism 10, and a forward drive manual shift position "M" (Manual) under which a manual shift running mode (manual mode) is established to set a so-called shift range that limits the shift gear positions in a high speed range during the execution of the automatic shift control.

In conjunction with the shift lever 49 being manually operated to each of the shift positions SP, for instance, the hydraulic control circuit 42 is electrically switched in such a way to establish each of the gear shift positions such as the reverse drive position "R", the neutral position "N" and the forward drive position "D" as shown in the engagement operation table shown in FIG. 2.

Among the various shift positions SP covering "P" to "M" positions, the "P" and "N" positions represent the non-running positions selected when no intension is present to run the vehicle. For the "P" and "N" positions to be selected, both the first and second clutches C1 and C2 are disengaged, as shown in, for example, the engagement operation table of FIG. 2, and non-drive positions are selected to place the power transmitting path in the power cutoff state. This causes the power transmitting path of the automatic shifting portion 20 to be interrupted, disenabling the vehicle to be driven.

The "R", "D" and "M" positions represent running positions selected when the vehicle is caused to run. These shift positions also represent drive positions selected when switching the power transmitting path to the power transmitting state under which at least one of the first and second clutches C1 and C2 is engaged as shown in, for example, the engagement operation table of FIG. 2. With such shifting positions are selected, the power transmitting path of the automatic shifting portion 20 is connected to enable the vehicle to be driven.

More particularly, with the shift lever 49 manually operated from the "P" position or the "N" position to the "R" position, the second clutch C2 is engaged so that the power transmitting path of the automatic shifting portion 20 is switched from the power cutoff state (neutral state) to the power transmitting state. With the shift lever 49 manually operated from the "N" position to the "D" position, at least the first clutch C1 is engaged, causing the power transmitting path of the automatic shifting portion 20 to be switched from the power cutoff state to the power transmitting state.

With the shift lever 49 manually operated from the "R" position to the "P" position or the "N" position, the second clutch C2 is disengaged, causing the power transmitting path of the automatic shifting portion 20 to be switched from the power transmitting state to the power cutoff state. With the shift lever 49 manually operated from the "D" position to the "N" position, the first and second clutches C1 and C2 are disengaged, causing the power transmitting path of the automatic shifting portion 20 to be switched from the power transmitting state to the power cutoff state.

The "M" position is located at the same position as the "D" position in the longitudinal direction of the vehicle, and is adjacent thereto in the lateral direction of the same. The shift lever 49 is operated to the "M" position, for manually selecting one of the above-indicated "D" through "L" positions.

Specifically, for the "M" position, an upshift position "+" and a downshift position "−" are provided in the front-rear direction of the vehicle. The shift lever 49 is manipulated to the upshift position "+" and the downshift position "−" to select any of the "D" range to the "L" range. For example, the five shifting ranges of the "D" range to the "L" range selected at the "M" position correspond to, in the changeable range of the overall speed ratio γT which can control the shifting mechanism 10 automatically, different kinds of shifting ranges in which the overall speed ratio γT at higher speed side (minimum gear ratio side) are different. Also, these five shifting ranges limit the shifting range i.e., scope of the shifting position (gear position) so that the maximum side shifting position which can control the shifting of the automatic shifting portion 20 is different.

The shift lever 49 is urged by urge means such as a spring from the upshift position "+" and the downshift position "−" to be automatically returned to the "M" position. In addition, the shift operation device 48 is provided with a shift position sensor (not shown) for detecting each of the shift positions of the shift lever 49, to output a signal representing the shift position of the shift lever 48, and the number of manipulation at the "M" position to the electronic control device 40.

When the "M" position is selected by manipulation of the shift lever 49, the automatic shift control is executed within the total speed ratio γT in which the shifting mechanism 10 can be shifted in each of the shifting ranges thereof, so as not to exceed the highest speed side shifting position or the shifting ratio of the shifting range. For example, in the step variable shifting running in which the shifting mechanism 10 is switched to the step variable shifting state, the automatic shift control is executed within the total speed ratio γT in which the shifting mechanism 10 can be shifted in each of the shifting ranges thereof.

In the continuously variable shifting running in which the shifting mechanism 10 is switched to the continuously variable shifting state, the automatic shift control is executed within the total speed ratio γT in which the shifting mechanism 10 can be shifted in each of the shifting ranges thereof, and which is obtained by continuously variable shift width i.e. spread of the power distributing mechanism 16, and each of the gear positions of the automatic shifting portion 20 to be automatically controlled corresponding to each of the shifting ranges within the changeable shifting positions. This "M" position corresponds to a shift position for selecting a manually shifting running mode (manual mode) i.e. a control style in which the shifting mechanism 10 is subjected to the manual shifting control.

Figure 7:
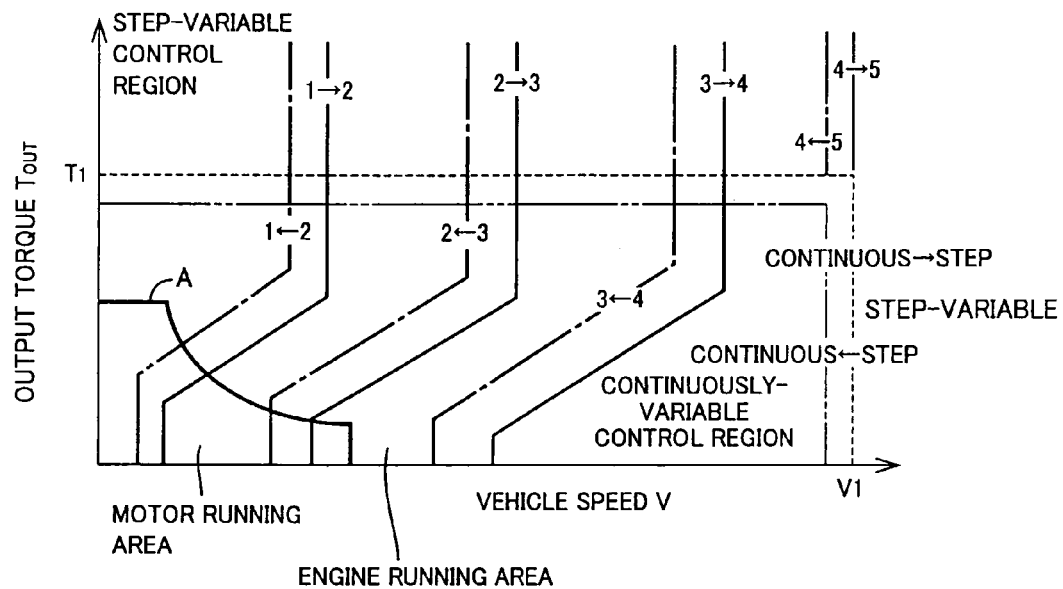
FIG. 7 is a view representing, on a two-dimensional coordinate in terms of parameters including a vehicle speed and output torque, one example of a preliminarily stored shifting diagram based on which the operation is executed whether to a shifting is executed in an automatic shifting portion; one example of preliminarily stored diagram based on which a shifting state of the shifting mechanism is switched; and one example of a preliminarily stored drive-force source switching diagram having a boundary line between an engine drive region and a motor drive region based on which an engine drive mode and a motor drive mode is switched.

FIG. 6 is a functional block diagram illustrating an essential part of a control function to be performed with the electronic control device 40. In FIG. 6, step-variable shifting control means 54 functions as shifting control means for the shifting the shifting the automatic shifting portion 20. For instance, the step-variable shifting control means 54 discriminates whether to execute the shifting in the automatic shifting portion 20 on the basis of a vehicle condition represented by the vehicle speed V and the demanded output torque $T_{OUT}$ for the automatic shifting portion 20 by referring to the relationships (including the shifting diagram and the shifting map), preliminarily stored in memory means 56, which are plotted in solid lines and single dot lines as shown in FIG. 7. That is, the step-variable shifting control means 54 discriminates a shifting position to be shifted in the automatic shifting portion 20, thereby causing the automatic shifting portion 20 to execute the shifting so as to obtain the discriminated shifting position. When this takes place, the step-variable shifting control means 54 outputs a command (shifting output command) to the hydraulic control circuit 42 for engaging and/or disengaging the hydraulic-type frictionally coupling devices, excepting the switching clutch C0 and the switching brake B0, so as to achieve a desired shifting position in accordance with, for instance, the engagement operation table shown in FIG. 2.

Hybrid control means 52 renders the engine 8 operative in an operating region at high efficiency, under the infinitely variable shifting state of the shifting mechanism 10, i.e., the differential state of the differential portion 11. At the same time, the hybrid control means 52 causes the engine 8 and the second electric motor M2 to deliver drive forces at varying distributing rates while causing the first electric motor M1 to generate electric power at a varying rate for a reactive force to be generated at an optimum value, thereby controlling the speed ratio γ0 of the differential portion 11 placed in the electrically controlled continuously variable transmission. For instance, during the running of the vehicle at a current vehicle speed, the hybrid control means 52 calculates a target (demanded) output of the vehicle by referring to the displacement value Acc of the accelerator pedal and the vehicle speed V that collectively represents the output demanded value intended by the driver.

Then, the hybrid control means 52 calculates a demanded total target output based on the target output and a charging request value of the vehicle. In order to obtain the total target output, the hybrid control means 52 calculates a target engine output with taking account of the transmitting a loss, loads on auxiliary units and assisting torque of the second electric motor M2, etc. Then, the hybrid control means 52 controls the engine 8 so as to provide the engine rotation speed NE and engine torque TE such that the target engine output is obtained, while controlling the first electric motor M1 to generate electric power at a proper power rate.

The hybrid control means 52 executes a hybrid control with taking account of the gear position of the automatic shifting portion 20 so as to obtain power performance and improved fuel consumption. During such a hybrid control, the differential portion 11 is rendered operative to function as the electrically controlled continuously variable transmission for the purpose of matching the engine rotation speed NE, determined for the engine 8 to operate at a high efficiency, to the rotation speed of the power transmitting member 18 determined based on the vehicle speed V and the selected gear position of the automatic shifting portion 20.

To this end, the hybrid control means 52 preliminarily stores therein an optimum fuel economy curve (including a fuel economy map and relevant relationship) of the engine 8 preliminarily determined on an experimental basis such that, during the running of the vehicle under the continuously variable shifting state, the vehicle has drivability and fuel economy performance in compatibility on a two-dimensional coordinate with parameters including, for instance, the engine rotation speed NE and output torque (engine torque) TE of the engine 8. In order to cause the engine 8 to operate on such an optimum fuel economy curve, a target value on the total speed ratio γT of the shifting mechanism 10 is determined so as to obtain engine torque TE and the engine rotation speed NE for the demanded engine output to be generated so as to satisfy, for instance, the target output (total target output and demanded drive force). To achieve such a target value, the hybrid control means 52 controls the speed ratio γ0 of the differential portion 11, while controlling the total speed ratio γT within a variable shifting range at a value, for instance, ranging from 13 to 0.5.

During such hybrid control, the hybrid control means 52 allows electric energy, generated by the first electric motor M1, to be supplied to a battery 60 and the second electric motor M2 through an inverter 58. This allows a major part of the drive force, delivered from the engine 8, to be mechanically transmitted to the power transmitting member 18 and the rest of the drive force of the engine 8 is delivered to the first electric motor M1 to be consumed thereby for conversion to electric power. The resulting electric energy is supplied through the inverter 58 to the second electric motor M2, which in turn is driven to provide a drive force for delivery to the power transmitting member 18. Equipments, involved in the operation of generating electric energy and the operation causing the second electric motor M2 to consume electric energy, establish an electric path in which the part of the drive force, delivered from the engine 8, is converted to electric energy which in turn is converted into mechanical energy.

The hybrid control means 52 functionally includes engine output control means for executing an output control of the engine 8 so as to provide the demanded engine output. The engine output control means allows the throttle actuator 97 to perform a throttle control so as to controllably open or close the electronic throttle valve 96. In addition, the engine output control means outputs commands to the engine output control device 43 so as to cause the fuel injection device 98 to control the fuel injection quantity and fuel injection timing for performing a fuel injection control while permitting the ignition device 99, such as an igniter or the like, to control an ignition timing for an ignition timing control. These commands are output in a single mode or a combined mode. For instance, the hybrid control means 52 drives the throttle actuator 97 in response to the acceleration opening signal Acc by fundamentally referring to the preliminarily stored relationship, not shown, so as to execute the throttle control such that the greater the accelerator opening Acc, the greater will be the throttle valve opening $\theta_{TH}$.

A solid line A, shown in FIG. 7, represents a boundary line between an engine drive region and a motor drive region for the engine 8 and an electric motor, i.e., for instance, the second electric motor M2 to be selectively switched as a drive force source for the vehicle to perform a startup/running (hereinafter referred to as "running"). In other words, the boundary line is used for switching a so-called engine drive mode, in which the engine 8 is caused to act as a running drive force source for starting up/running (hereinafter referred to as "running") the vehicle, and a so-called motor drive mode in which the second electric motor M2 is caused to act as a drive force source for running the vehicle.

The preliminarily stored relationship, having the boundary line (in the solid line A) shown in FIG. 7 for the engine drive region and the motor drive region to be switched, represents one example of a drive-force source switching diagram (drive force source map), formed on a two-dimensional coordinate, which includes parameters such as the vehicle speed V and output torque $T_{OUT}$ representing a drive force correlation value. Memory means 56 preliminarily stores such a drive-force source switching diagram together with the shifting diagram (shifting map) designated by, for instance, the solid line and the single dot line in FIG. 7.

The hybrid control means 52 determines which of the motor drive region and the engine drive region is to be selected based on the vehicle condition, represented by the vehicle speed V and demanded torque output $T_{OUT}$ by referring to, for instance, the drive-force source switching diagram shown in FIG. 7, thereby executing the motor drive mode or the engine drive mode. Thus, the hybrid control means 52 executes the motor drive mode at relatively low output torque $T_{OUT}$, i.e., low engine torque TE, at which an engine efficiency is generally regarded to be lower than that involved a high torque region, or a relatively low vehicle speed range of the vehicle speed V, i.e., under a low load region as will be apparent from FIG. 7.

During such a motor drive mode, the hybrid control means 52 renders the differential portion 11 operative to perform an electrical CVT function (differential function) for controlling the first-motor rotation speed $N_{M1}$ at a negative rotation speed, i.e., at an idling speed to maintain the engine rotation speed NE at a zeroed or nearly zeroed level, thereby minimizing a drag of the engine 8, remained under a halted state, for providing improved fuel economy.

Further, even under the engine drive region, the hybrid control means 52 may execute the operation to allow the second electric motor M2 to be supplied with electric energy, generated by the first electric motor M1, and/or electric energy delivered from the battery 60 via the electric path mentioned above. This causes the second electric motor M2 to be driven for performing a torque assisting operation to assist the drive force of the engine 8. Thus, for the illustrated embodiment, the term "engine drive mode" may refer to an operation covering the engine drive mode and the motor drive mode in combination.

Further, the hybrid control means 52 can cause the differential portion 11 to perform the electrical CVT function through which the engine 8 can be maintained under the operating state regardless of the vehicle left in a halted condition or a low speed condition. For instance, if a drop occurs in a state of charge SOC of the battery 60 during the halt of the vehicle with a need occurring on the first electric motor M1 to generate electric power, the drive force of the engine 8 drives the first electric motor M1 to generate electric power with an increase in the rotation speed of the first electric motor M1. Thus, even if the second-motor rotation speed $N_{M2}$, uniquely determined with the vehicle speed V, is zeroed (nearly zeroed) due to the halted condition of the vehicle, the power distributing mechanism 16 performs the differential action, causing the engine rotation speed NE to be maintained at a level beyond an autonomous rotation speed.

The hybrid control means 52 executes the operation to cause the differential portion 11 to perform the electrical CVT function for controlling the first-motor M1 rotation speed $N_{M1}$ and the second-motor M2 rotation speed $N_{M2}$ to maintain the engine rotation speed NE at an arbitrary level regardless of the vehicle remaining under the halted or running state. As will be understood from the collinear chart shown in FIG. 3, for instance, when raising the engine rotation speed NE, the hybrid control means 52 executes the operation to maintain the second-motor M2 rotation speed $N_{M2}$, bound with the vehicle speed V, at a nearly fixed level while raising the first-motor M1 rotation speed $N_{M1}$.

In placing the shifting mechanism 10 in the step-variable shifting state, increasing-speed gear-position determining means 62 determines which of the switching clutch C0 and the switching brake B0 is to be engaged. To this end, the increasing-speed gear-position determining means 62 executes the operation based on, for instance, the vehicle condition according to the shifting diagram, shown in FIG. 7, which is preliminarily stored in the memory means 56, to determine whether or not a gear position to be shifted in the shifting mechanism 10 is an increasing-speed gear position, i.e., for instance, a 5th-speed gear position.

Differential state switching control means 50 switches the engaging and disengaging states of the differential state switching device (switching clutch C0 and switching brake B0) based on the vehicle condition, thereby selectively executing a switchover between the continuously variable shifting state and the step-variable shifting state, i.e., between the differential state and the locked state. For instance, the differential state witching control means 50 executes the operation based on the vehicle condition, represented with the vehicle speed V and demanded output torque $T_{OUT}$, by referring to the relationships (shifting diagram and shifting map), preliminarily stored in the memory means 56, which are shown in the broken line and the double dot line in FIG. 7, thereby determining whether to switch the shifting state of the shifting mechanism 10 (differential portion 11).

That is, the operation is executed to determine whether there exist a continuously variable shifting control region for the shifting mechanism 10 to be placed in the continuously variable shifting state or a step-variable shifting control region for the shifting mechanism 10 to be placed in the step-variable shifting state. This allows the operation to be executed for determining the shifting state to be switched in the shifting mechanism 10, thereby executing the operation to selectively switch the shifting state to one of the continuously variable shifting state and the step-variable shifting state.

More particularly, if the determination is made that the shifting mechanism 10 lies in the step-variable shifting control region, then, the differential state switching control means 50 outputs a signal to the hybrid control means 52 for disenabling or interrupting the hybrid control or the continuously variable shifting control, while permitting the step-variable shifting control means 54 to perform the shifting for the step-variable shifting operation that has been preliminarily determined. When this takes place, the step-variable shifting control means 54 allows the automatic shifting portion 20 to perform the automatic shifting in accordance with, for instance, the shifting diagram shown in FIG. 7 and preliminarily stored in the memory means 56.

For instance, the engagement operation table, shown in FIG. 2 and preliminarily stored in the memory means 56, represents the operations in combination of the hydraulically operated frictional engaging devices, that is, the clutches C0, C1 and C2 and the brakes B0, B1, B2 and B3 to be selected in such a shifting operation. That is, a whole of the shifting mechanism 10, i.e., the differential portion 11 and the automatic shifting portion 20, functions as a so-called step-variable automatic transmission, thereby establishing the gear positions according to the engagement operation table shown in FIG. 2.

For instance, if the increasing-speed gear-position determining means 62 determines that the 5th-gear position is to be selected, the shifting mechanism 10 as a whole can obtain a so-called overdrive-gear position on an increasing-speed gear position with a speed ratio less than "1.0" as a whole. To this end, the differential state switching control means 50 outputs a command to the hydraulic control circuit 42 for disengaging the switching clutch C0 and engaging the switching brake B0 to allow the differential portion 11 to function as an auxliary power transmission with a fixed speed ratio γ0, i.e., for instance, the speed ratio γ0 equal to "0.7".

If the increasing-speed gear-position determining means 62 determines that no 5th-gear position is to be selected, the shifting mechanism 10 as a whole can obtain a decreasing-speed gear position with a speed ratio of "1.0" or more. To this end, the differential state switching control means 50 outputs another command to the hydraulic control circuit 42 for engaging the switching clutch C0 and disengaging the switching brake B0 to allow the differential portion 11 to function as the auxiliary power transmission with the fixed speed ratio γ0, i.e., for instance, the speed ratio γ0 equal to "1".

Thus, the differential state switching control means 50 causes the shifting mechanism 10 to be switched in the step-variable shifting state under which the operation is executed to selectively switch the gear positions of two kinds to either one gear position. With the differential portion 11 rendered operative to function as the auxiliary power transmission while the automatic shifting portion 20, connected to the differential portion 11 in series, is rendered operative to function as the step-variable transmission, the shifting mechanism 10 as a whole is rendered operative to function as the so-called step-variable automatic transmission.

On the contrary, if the differential state switching control means 50 determines that the shifting mechanism 10 remains in the continuously variable shifting control region to be switched in the continuously variable shifting state, the shifting mechanism 10 as a whole can obtain the continuously variable shifting state. To this end, the differential state switching control means 50 outputs a command to the hydraulic control circuit 42 for disengaging both the switching clutch C0 and the switching brake B0 so as to place the differential portion 11 in the continuously variable shifting state to enable an infinitely variable shifting operation to be executed. Simultaneously, the differential state switching control means 50 outputs a signal to the hybrid control means 52 for permitting the hybrid control to be executed, while outputting a given signal to the step-variable shifting control means 54. As used herein, the term "given signal" refers to a signal, by which the shifting mechanism 10 is fixed to a gear position for a predetermined continuously variable shifting state, or a signal for permitting the automatic shifting portion 20 to perform the automatic shifting according to, for instance, the shifting diagram, shown in FIG. 7, which is preliminarily stored in the memory means 56.

In this case, the step-variable shifting control means 54 performs the automatic shifting upon executing the operation excepting the operations to engage the switching clutch C0 and the switching brake B0 in the engagement operation table shown in FIG. 2. This causes the differential state switching control means 50 to switch the differential portion 11 to the continuously variable shifting state to function as the continuously variable transmission, while rendering the automatic shifting portion 20, connected to the differential portion 11 in series, operative to function as the step-variable transmission. This allows a drive force to be obtained with an appropriate magnitude. Simultaneously, the rotation speed input to the automatic shifting portion 20, i.e., the rotation speed of the power transmitting member 18 is continuously varied for each gear position of the 1st-speed, 2nd-speed, 3rd-speed and 4th-speed positions of the automatic shifting portion 20, enabling the respective gear positions to be obtained in infinitely variable speed ratio ranges. Accordingly, since the speed ratio is continuously variable across the adjacent gear positions, the shifting mechanism 10 as a whole can obtain the overall speed ratio γT in an infinitely variable mode.

Now, FIG. 7 will be described more in detail. FIG. 7 is a view showing the relationships (shifting diagram and shifting map), preliminarily stored in the memory means 56, based on which the shifting of the automatic shifting portion 20 is determined, and representing one example of the shifting diagram plotted on a two-dimensional coordinate with parameters including the vehicle speed V and demanded output torque $T_{OUT}$ indicative of the drive force correlation value. In FIG. 7, the solid lines represent upshift lines and single dot lines represent downshift lines.

In FIG. 7, the broken lines represent a determining vehicle speed V1 and a determining output torque T1 for the switching control means 50 to determine the step-variable control region and the continuously variable control region. That is, the broken lines in FIG. 7, represent a high vehicle-speed determining line, forming a series of a determining vehicle speed V1 representing a predetermined high-speed drive determining line for determining a high speed running state of a hybrid vehicle, and a high-output drive determining line, forming a series of determining output torque T1 representing a predetermined high-output drive determining line for determining the drive force correlation value related to the drive force of the hybrid vehicle. As used herein, the term "drive force correlation value" refers to determining output torque T1 that is preset for determining a high output drive for the automatic shifting portion 20 to provide output torque $T_{OUT}$ at a high output.

A hysteresis is provided for determining the step-variable control region and the continuously variable control region as indicated by a double dot line in FIG. 7 in contrast to the broken line. That is, FIG. 7 represents a shifting diagram (switching map and relationship), preliminarily stored in terms of the parameters including the vehicle speed V, including the determining vehicle speed V1 and determining output torque T1, and output torque $T_{OUT}$, based on which the differential state switching control means 50 executes the determination on a region as to which of the step-variable control region and the continuously variable control region belongs to the shifting mechanism 10.

The memory means 56 may preliminarily store the shifting map, inclusive of such a shifting diagram. Moreover, the shifting diagram may be of the type that includes at least one of the determining vehicle speed V1 and determining output torque T1 and may include a preliminarily stored shifting diagram with a parameter taking any of the vehicle speed V and output torque $T_{OUT}$.

The shifting diagram, the switching diagram or the drive-force source switching diagram or the like may be stored not in the map but in a determining formula for making comparison between a current vehicle speed V and a determining vehicle speed V1, and another determining formula or the like for making comparison between output torque $T_{OUT}$ and determining output torque T1. In this casing, the differential state switching control means 50 places the shifting mechanism 10 in the step-variable shifting state when the vehicle condition such as, for instance, an actual vehicle speed exceeds the determining vehicle speed V1. In addition, the switching control means 50 places the shifting mechanism 10 in the step-variable shifting state when the vehicle condition such as, for instance, output torque $T_{OUT}$ of the automatic shifting portion 20 exceeds determining output torque T1.

When a malfunction or functional deterioration occurs in electrical control equipment such as an electric motor or the like used for rendering the differential portion 11 operative as the electrically controlled continuously variable transmission, the differential state switching control means 50 may be configured to place the shifting mechanism 10 in the step-variable shifting state on a priority basis for the purpose of ensuring the running of the vehicle to even if the shifting mechanism 10 remains in the continuously variable control region. As used herein, the term "malfunction or functional deterioration in electrical control equipment" refers to a vehicle condition in which: functional degradation occurs in equipment related to the electrical path involved in the operation of the first electric motor M1 to generate electric energy and the operation executed in converting such electric energy to mechanical energy; that is, failures or functional deteriorations, caused by a breakdown or low temperature, occur in the first electric motor M1, the second electric motor M2, the inverter 58, the battery 60 and transmission paths interconnecting these component parts.

As used herein, the term "drive force correlation value" described above refers to a parameter corresponding to the drive force of the vehicle in one-to-one relation. Such a parameter may include not only drive torque or drive force delivered to the drive wheels 38 but also: output torque $T_{OUT}$ of the automatic shifting portion 20; engine output torque TE; an acceleration value of the vehicle; an actual value such as engine output torque TE calculated based on, for instance, the accelerator operating or the throttle valve opening $\theta_{TH}$ (or an intake air quantity, an air/fuel ratio or a fuel injection amount) and the engine rotation speed NE; or an estimated value such as engine output torque TE or the demanded output torque $T_{OUT}$ for the automatic shifting portion 20 or demanded vehicle drive force calculated based on a displacement value of the accelerator pedal actuated by the driver or the throttle valve operating or the like. In addition, the drive torque may be calculated upon taking a differential ratio and a radius of each drive wheel 38 into consideration by referring to output torque $T_{OUT}$ or the like or may be directly detected using a torque sensor or the like. This is true for each of other torques mentioned above.

For instance, the operation of the shifting mechanism 10 under the continuously variable shifting state during the running of the vehicle at the high speed turns out a consequence of deterioration in fuel economy. The determining vehicle speed V1 is determined to a value that can render the shifting mechanism 10 operative in the step-variable shifting state during the running of the vehicle at the high speed so as to address such an issue. Further, determining torque T1 is determined to a value that prevents reactive torque of the first electric motor M1 from covering a high output region of the engine during the running of the vehicle at a high output. That is, determining torque T1 is determined to such a value depending on, for instance, a characteristic of the first electric motor M1 that is possibly mounted with a reduced maximum output in electric energy for miniaturizing the first electric motor M1.

Figure 8:
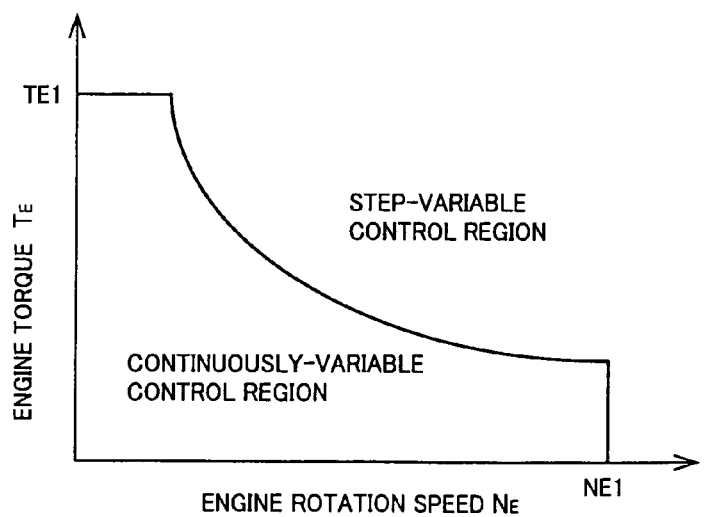
FIG. 8 is a conceptual view, showing the preliminarily stored relationship, involving a boundary line, between a continuously variable control region and a step-variable control region, which is suitable for mapping a boundary between the continuously variable control region and the step-variable control region shown in broken lines in FIG. 7.

FIG. 8 represents a switching diagram (switching map and relationship), preliminarily stored in the memory means 56, which has an engine output line in the form of a boundary line to allow the switching control means 50 to determine a region based on the step-variable control region and the continuously variable control region using parameters including the engine rotation speed NE and engine torque TE. The differential state switching control means 50 may execute the operation based on the engine rotation speed NE and engine torque TE by referring to the switching diagram shown in FIG. 8 in place of the switching diagram shown in FIG. 7. That is, the switching control means 50 may determine whether the vehicle condition, represented with the engine rotation speed NE and engine torque TE, lies in the step-variable control region or the continuously variable control region.

Further, FIG. 8 is also a conceptual view based on which the broken line in FIG. 7 is to be created. In other words, the broken line in FIG. 7 is also a switching line rewritten on a two-dimensional coordinate in terms of the parameters including the vehicle speed V and output torque $T_{OUT}$ based on the relational diagram (map) shown in FIG. 8.

As indicated on the relationships shown in FIG. 7, the step-variable control region is set to lie in a high torque region, where output torque $T_{OUT}$ is greater than the predetermined determining output torque T1, or a high vehicle speed region where the vehicle speed V is greater than the predetermined determining vehicle speed V1. Therefore, a step-variable shift drive mode is effectuated in a high drive torque region, where the engine 8 operates at relatively high torque, or the vehicle speed remaining in a relatively high speed region. Further, a continuously variable shift drive mode is effectuated in a low drive torque region, where the engine 8 operates at relatively low torque, or the vehicle speed remaining in a relatively low speed region, i.e., during a phase of the engine 8 operating in a commonly used output region.

As indicated by the relationship shown in FIG. 8, similarly, the step-variable control region is set to lie in a high-torque region with engine torque TE exceeding a predetermined given value TE1, a high-speed rotating region with the engine rotation speed NE exceeding a predetermined given value NE1, or a high output region where the engine output calculated, based on engine torque TE and the engine rotation speed NE, is greater than a given value. Therefore, the step-variable shift drive mode is effectuated at relatively high torque, relatively high rotation speed or relatively high output of the engine 8. The continuously variable shift drive mode is effectuated at relatively low torque, relatively low rotation speed or relatively low output of the engine 8, i.e., in the commonly used output region of the engine 8. The boundary line, shown in FIG. 8, between the step-variable control region and the continuously variable control region corresponds to a high vehicle-speed determining line which is a series of a high vehicle-speed determining line and a high-output drive determining value which is a series of a high-output drive determining value.

With such a boundary line, for instance, during the vehicle running at a low/medium speed and low/medium output, the shifting mechanism 10 is placed in the continuously variable shifting state to ensure the vehicle to have improved fuel economy performance. During the running of the vehicle at a high speed with an actual vehicle speed V exceeding the determining vehicle speed V1, the shifting mechanism 10 is placed in the step-variable shifting state to act as the step-variable transmission. In this moment, the output of the engine 8 is transferred to the drive wheels 38 mainly through a mechanical power transmitting path. This suppresses a loss in conversion between the drive force and electric energy, generated when the shifting mechanism 10 is caused to act as the electrically controlled continuously variable transmission, providing improved fuel consumption.

During the running of the vehicle on the high output drive mode with the drive force correlation value, such as output torque $T_{OUT}$ or the like, which exceeds determining torque T1, the shifting mechanism 10 is placed in the step-variable shifting state to act as the step-variable transmission. In this moment, the output of the engine 8 is transferred to the drive wheels 38 mainly through the mechanical power transmitting path. In this case, the electrically controlled continuously variable transmission is caused to operate in the low/medium speed running region and the low/medium output running region of the vehicle. This enables a reduction in the maximum value of electric energy to be generated by the first electric motor M1, i.e., electric energy to be transmitted by the first electric motor M1, thereby causing the first electric motor M1 per se or a vehicle drive apparatus including such a component part to be further miniaturized in structure.

According to another viewpoint, further, during the vehicle running on such a high output drive mode, the driver places more emphasis on a requirement for the drive force and less emphasis on a requirement for a mileage and, thus, the shifting mechanism 10 is switched to the step-variable shifting state (fixed shifting state) rather than to the continuously variable shifting state. With such a switching operation, the driver can enjoy a fluctuation in the engine rotation speed NE, i.e., a rhythmical variation in the engine rotation speed NE caused by the upshifting in the step-variable automatic shift running mode.

The shifting mechanism 10 of this embodiment includes two oil pumps, i.e., a mechanically-operated oil pump 70 connected to the engine 8 to be driven in response to operation thereof, and an electrically-operated oil pump 72 driven by electric power. The mechanically-operated oil pump 70 is a gear type oil pump comprised of a driven gear and a drive gear (both not shown). The mechanically-operated oil pump 70 is connected to an output shaft of the engine 8 to be driven by rotation thereof. Accordingly, the mechanically-operated oil pump 70 is driven upon driving (operating) of the engine 8, and is stopped upon non-driving (non-operating) of the engine 8.

The electrically-operated oil pump 72 is driven by an oil pump motor 74 which serves as a driving source thereof and of which rotation speed can be controlled. The rotation speed of the oil pump motor 74 is controlled based on an oil temperature of operation oil, an input torque input to the automatic shifting portion 20, etc., thus controlling the discharge amount from the electrically-operated oil pump 72.

Figure 9:
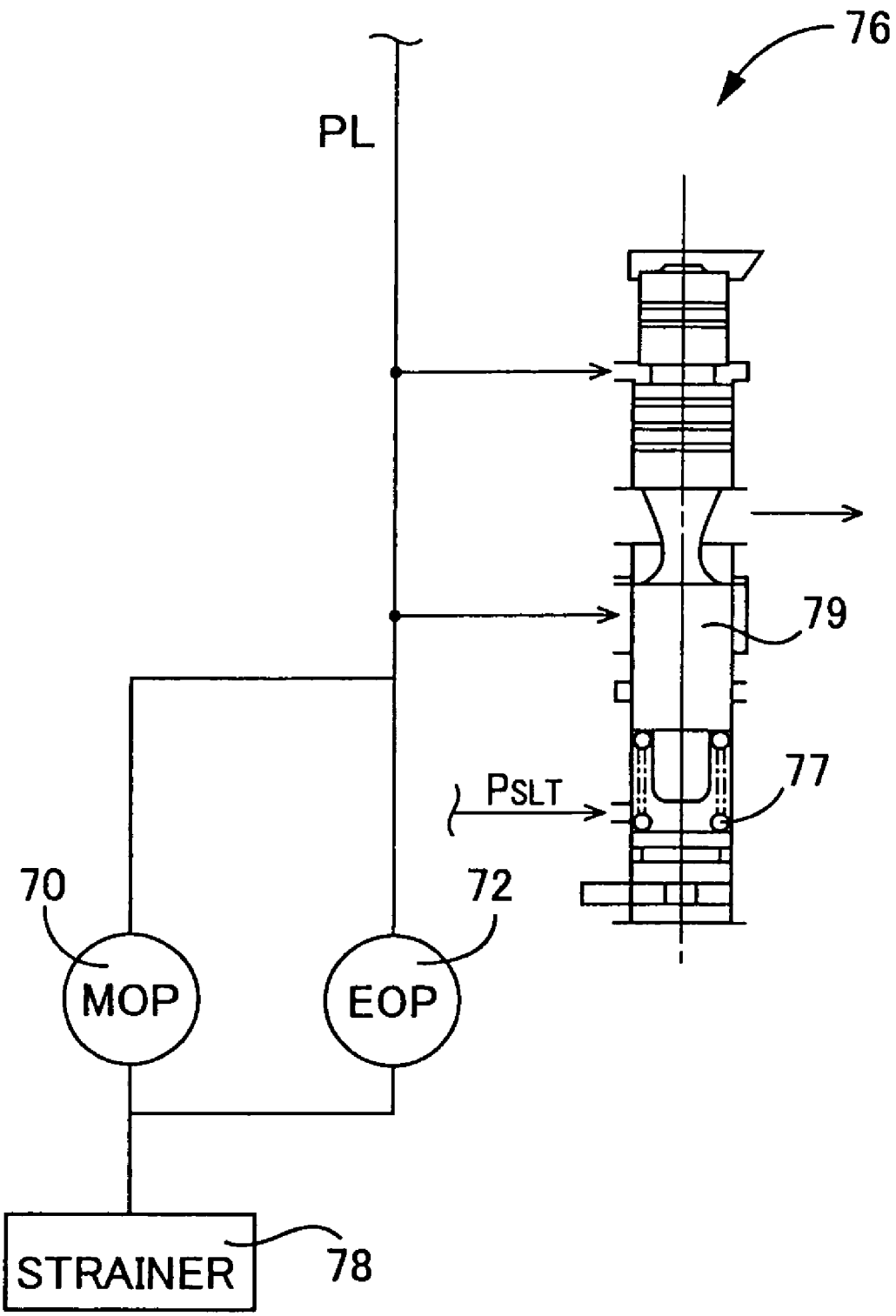
FIG. 9 is a schematic view illustrating a structure of a regulator valve, an electrically-operated oil pump, and a mechanically-operated oil pump that form a part of a hydraulic control circuit.

FIG. 9 is a schematic view illustrating a structure of the mechanically-operated oil pump 70, the electrically-operated oil pump 72, and a regulator valve 76 that forms a part of a hydraulic control circuit 42 of this embodiment. Operation oil stored in an oil pan (not shown) is drawn up through a strainer 78 by driving either or both of the mechanically-operated oil pump 70 and the electrically-operated oil pump 72 which are disposed parallel with each other. This operation oil is regulated to have a line pressure PL by the regulator valve 76 disposed on the downstream side of these oil pumps.

The regulator valve 76 is a relief type pressure-regulating valve. With no oil pressure supplied, a spool 79 is moved to a totally-closed position by elastic force of a spring 77 to bring the regulator valve 76 to a valve-closed state (non-operation state). Driving the mechanically-operated oil pump 70 or the electrically-operated oil pump 72 supplies the oil pressure to the regulator valve 76 shared by the two oil pumps to open (actuate) it. An oil pressure $P_{SLT}$ output from a linear solenoid valve (not shown) is supplied to the regulator valve 76, based on which the operation oil is regulated to have a line pressure PL according to the running state of the vehicle. The regulator valve 76 of this embodiment corresponds to a variable load means of the present invention.

The oil pump control means 110 controls drive states of the mechanically-operated oil pump 70 and the electrically-operated oil pump 72 in accordance with the vehicle state. For example, during engine running since the mechanically-operated oil pump 70 is being driven by the engine 8, the electrically-operated oil pump 72 is stopped. On the other hand, during motor running with non-driving of the engine 8, since the mechanically-operated oil pump 70 is not being driven, the electrically-operated oil pump 72 is driven to generate the oil pressure. Here, even during motor running state, no oil pressure is required as long as the automatic shifting portion 20 is not shifted, and the electrically-operated oil pump 72 is held in the stopped state.

For example, when the vehicle is started from a stopped state thereof, the oil pressure is generated from a state in which both the mechanically-operated oil pump 70 and the electrically-operated oil pump 72 are stopped. Normally, the vehicle is started by the motor (second electric motor M2) with non-starting of the engine 8, and the electrically-operated oil pump 72 generates the oil pressure. At this time, the regulator valve 76 shown in FIG. 9 is held in a valve-closed state (non-operation state) by the elastic force of a spring (not shown). Therefore, a load imposed on the electrically-operated oil pump 72 by initial resistance for opening (operating) the regulator valve 76 momentarily increases. Especially when the operation oil is low in an oil temperature thereof, i.e. is high in an oil viscosity thereof, the load imposed thereon may be greatly increased.

Additionally, there is a fear that excessive current will be generated in an electronic control circuit that supplies electric power to the oil pump motor 74 of the electrically-operated oil pump 72 in response to an increase in the load imposed thereon. Here, this electronic control circuit may be disposed inside the electronic control device 40, or independent therefrom.

In view of the above, when the electrically-operated oil pump 72 is started from the state in which both the mechanically-operated oil pump 70 and the electrically-operated oil pump 72 are stopped, the oil pump control means 110 performs control to reduce the load imposed on the electrically-operated oil pump 72. A description focus mainly on this control will be given hereinafter.

Referring back to FIG. 6, engine stop determining means 112 determines whether or not the engine 8 is in a stopped state. The determination of a stopped state of the engine 8 is made based on, for example, whether or not the rotation speed NE of the engine 8 is zero (0), and means that the mechanically-operated oil pump 70 is not being driven.

An electrically-operated oil pump start requirement determining means 114 (hereinafter, referred to simply as a "pump start requirement determining means 114") determines whether or not a requirement to start the electrically-operated oil pump 72 is occurred. For example, the electrically-operated oil pump 72 is required to be started, when after insertion of an ignition key a start button is turned on in a vehicle-stopped state, or when switching is performed from an engine running state to a motor running state during vehicle running.

If the engine stop determining means 112 determines the stopped state of the engine 8, and the pump start requirement determining means 114 determines a starting requirement of the electrically-operated oil pump 72, the oil pump control means 110 starts the electrically-operated oil pump 72. Here the oil pump control means 110 pre-starts the mechanically-operated oil pump 70, that is starts it in advance for a predetermined time period before starting the electrically-operated oil pump 72. Thus, the oil pump control means 110 operates to bring the regulator valve 76 into the valve-opened state (i.e. pressure-regulated state in which the spool 79 is moved to a pressure regulation position to relieve the operation oil), and then starts the electrically-operated oil pump 72.

Upon driving the mechanically-operated oil pump 70, the oil pump control means 110 does not drive the engine 8 itself, but controls the first electric motor-M1 connected to the differential-portion sun gear S0 of the differential portion 11. Thus, the rotation speed NE of the engine 8 increases to drive the mechanically-operated oil pump 70.

Figure 10:
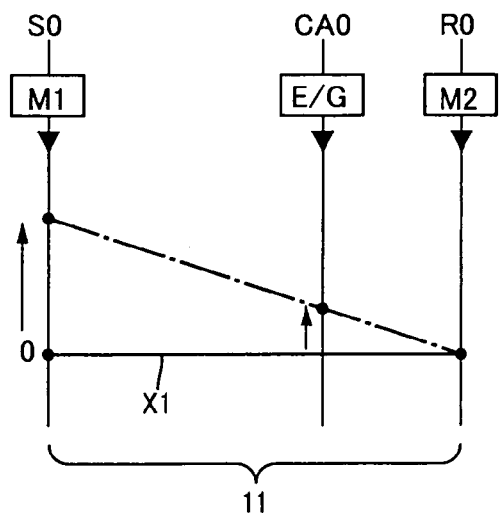
FIG. 10 shows, in a collinear chart illustrating the relative rotation speed of rotary elements in a differential portion, a state in which the rotation speed of an engine is increased by a first electric motor.

FIG. 10 shows, in a collinear chart illustrating the relative rotation speed of each of the rotary elements in the differential portion 11, a state in which the rotation speed NE of the engine 8 is increased by the first electric motor M1. In a vehicle-stopped state, each rotary element is stopped as shown by the solid line X1. Here, if the rotation speed of the differential-portion sun gear S0 is increased by the first electric motor M1 as shown by the alternate long and short dash line, the rotation speed NE of the differential-portion carrier CA0, i.e., that of the engine 8 is increased by the differential operation of the differential portion 11. Based on this rotation speed of the engine 8, the mechanically-operated oil pump 70 is driven. The regulator valve 76 is opened (operated) by the oil pressure of operation oil drawn up by the mechanically-operated oil pump 70. The first electric motor M1 of this embodiment corresponds to the electric motor of the present invention.

The rotation speed $N_{M1}$ of the first electric motor M1 indicated at this time is pre-set for example through experiments and stored. The rotation speed $N_{M1}$ of the first electric motor M1 can be changed according to, for example, the oil temperature of the operation oil.

The driving time period of the mechanically-operated oil pump 70 is controlled by, for example, timer control. An elapsed-time determining means 116 determines whether or not the driving time of the mechanically-operated oil pump 70 elapses i.e. exceeds a predetermined time period. If the driving time of the mechanically-operated oil pump 70 exceeds the predetermined time, the oil pump control means 110 operates to stop driving the mechanically-operated oil pump 70, i.e., to stop increasing the engine rotation speed NE by the first electric motor M1, and to start controlling the electrically-operated oil pump 72. The above-mentioned predetermined time period is pre-set for example, through experiments and is stored in advance to have a predetermined length necessary to open (operate) the regulator valve 76.

Accordingly, when the electrically-operated oil pump 72 is started, the load imposed is reduced because the regulator valve 76 is pre-operated such that the spool 79a opens a port for releasing the operation oil. This predetermined time can be changed according to other parameters, such as the oil temperature of the operation oil.

Figure 11:
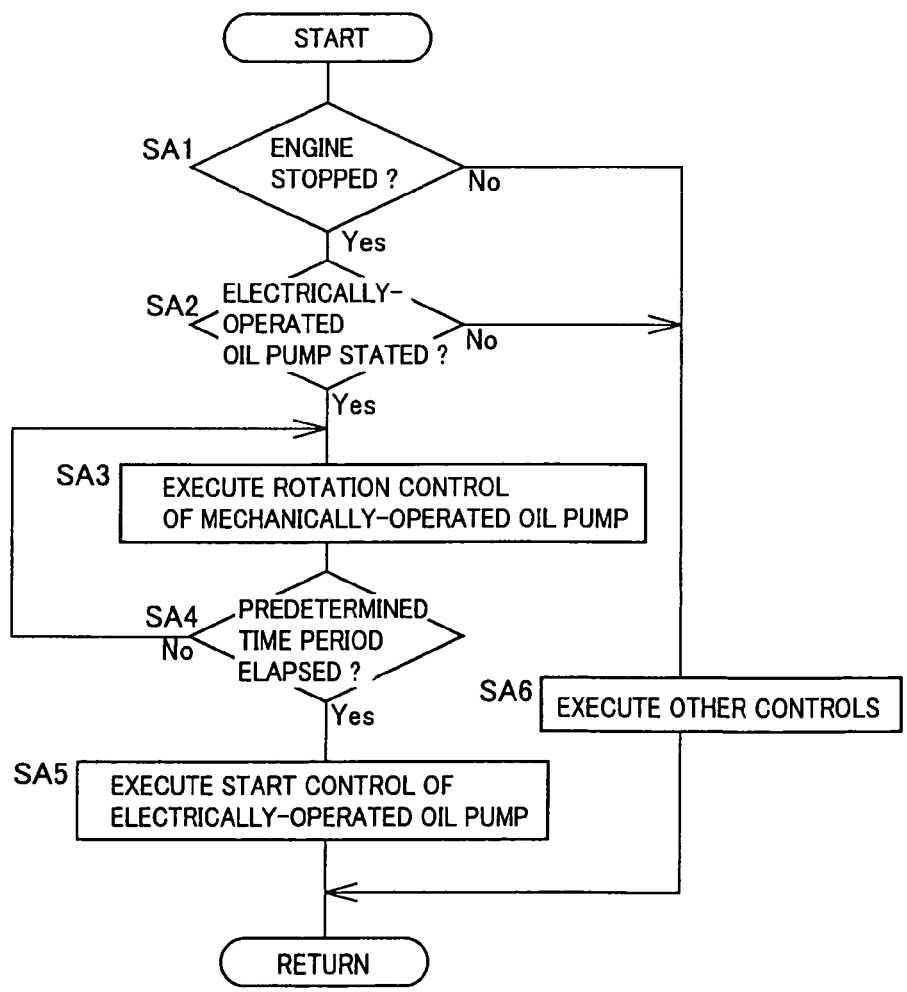
FIG. 11 is a flow chart explaining a main part of a control operation of an electronic control device, that is the flow chart explaining the a control operation for reducing a load imposed on the electrically-operated oil pump, when the electrically-operated oil pump is started from a state in which both the mechanically-operated oil pump and the electrically-operated oil pump are stopped
Figure 12:
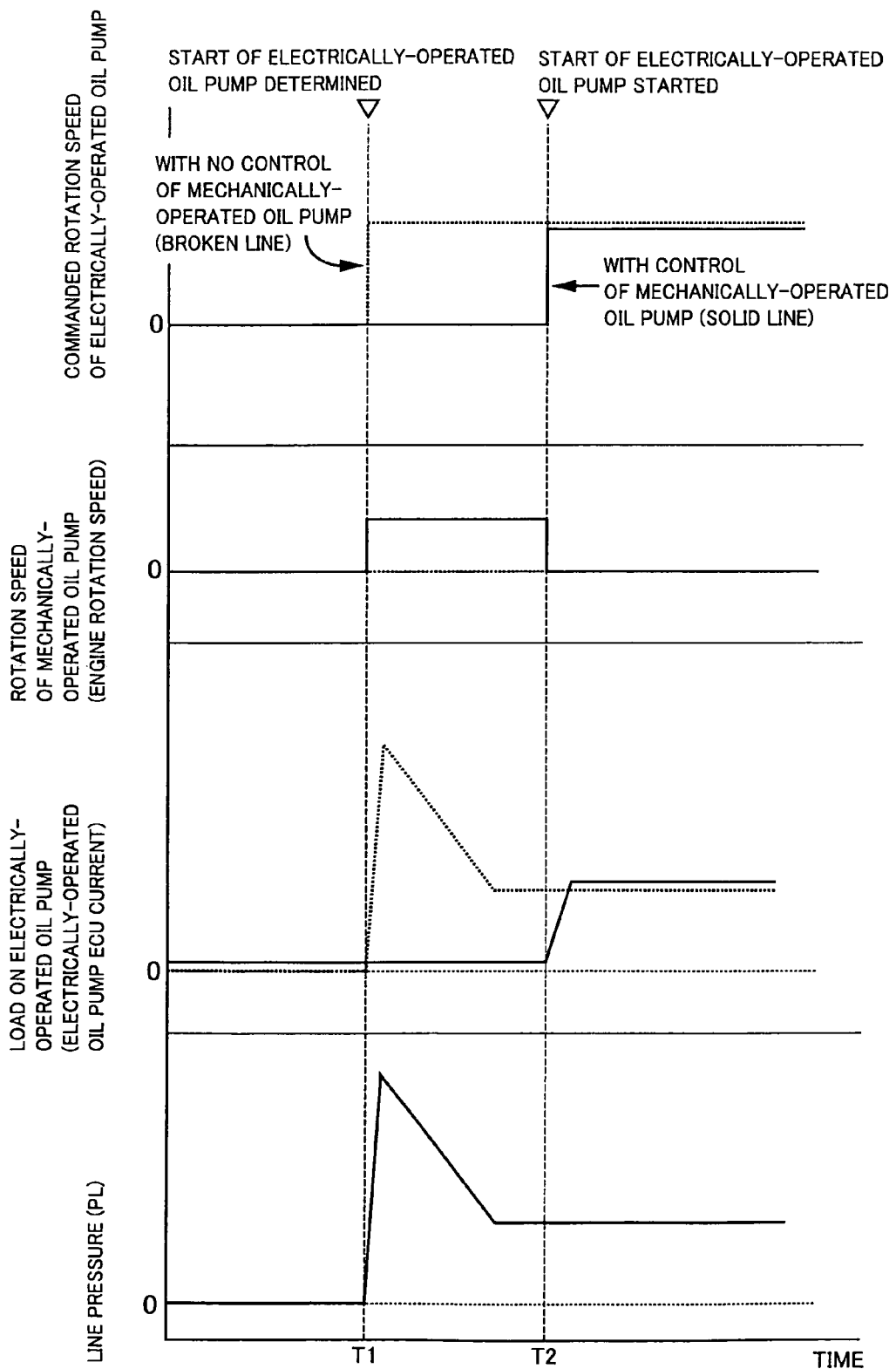
FIG. 12 is a time chart showing one example of the control operation shown in the flow chart of FIG. 11, explaining the control operation for reducing a load imposed on the electrically-operated oil pump upon starting thereof.

FIG. 11 is a flow chart explaining a main part of a control operation of the electronic control device 40. In more detail, FIG. 11 shows the control operation for reducing the load imposed on the electrically operated oil pump 72 upon starting thereof from the state in which both the mechanically-operated oil pump 70 and the electrically-operated oil pump 72 are being stopped. FIG. 12 is a time chart showing one example of the control operation for the flow chart shown in FIG. 11, i.e. the control operation for reducing the load imposed on the electrically-operated oil pump 72 upon starting the electrically-operated oil pump 72.

First, in step SA1 (hereinafter, the term "step" is omitted) corresponding to the engine stop determining means 112, whether or not the engine 8 is held in a stopped state is determined. If a negative determination is made in SA1, another control is performed in SA6. If an affirmative determination is made in SA1, whether or not a starting requirement of the electrically operated oil pump 72 is occurred is determined in SA2 which corresponds to the pump start requirement determining means 114. If a negative determination is made in SA2, another control is performed in SA6. If an affirmative determination is made in SA2, the rotation control of the mechanically-operated oil pump 70 is started by the driving of the first electric motor M1 in SA3 which corresponds to the oil pump control means 110.

Time point i.e. timing T1 in FIG. 12 shows, under the state in which driving of the electrically-operated oil pump 72 is required, the mechanically-operated oil pump 70 is started by the oil pump control means 110 before starting the electrically-operated oil pump 72. In FIG. 12, solid lines show states in which the mechanically-operated oil pump 70 is started upon starting the electrically-operated oil pump 72 along the present invention, whereas broken lines show states in which only the electrically-operated oil pump 72 is as in the conventional technique.

When the mechanically-operated oil pump 70 is driven by rotating the engine 8 with the first electric motor M1, the line pressure PL momentarily increases at time point T1 due to the operating resistance of the regulator valve 76. The same waveform is obtained even when only the electrically-operated oil pump 72 is started for the regulator valve 76. If only the electrically-operated oil pump 72 is started for the regulator valve 76, momentary excessive current may occur in the electronic control circuit that controls the electrically-operated oil pump 72, as shown by the broken line as an increase in the line pressure PL.

Referring back to FIG. 11, when the rotation control is started by the mechanically-operated oil pump 70 in SA3, it is determined in SA4, which corresponds to the elapsed-time determining means 116, whether or not the predetermined time period is elapsed from the driving start of the mechanically-operated oil pump 70. If a negative determination is made in SA4, the process returns to SA3 to continuously drive the mechanically-operated oil pump 70. If the predetermined time period is elapsed, an affirmative determination is made in SA4. Thus, in SA5 which corresponds to the oil pump control means 110, the mechanically-operated oil pump 70 stops and then the electrically-operated oil pump 72 starts.

Time point i.e. timing T2 of FIG. 12 shows a state in which the electrically-operated oil pump 72 is started, and the mechanically-operated oil pump 70 is stopped. At time point T2, the regulator valve 76 is held in a pre-opened (pre-operated) state by the mechanically-operated oil pump 70. For this reason, the load imposed on the electrically operated oil pump 72 is reduced upon starting thereof, which can prevent excessive current from occurring in the electronic control circuit for the electrically operated oil pump 72.

Effects obtained by this embodiment will be described hereinafter. First, in the hydraulic control circuit 42 including the mechanically-operated oil pump 70, the electrically-operated oil pump 72, and the regulator valve 76, for starting the electrically-operated oil pump 72 from the state in which both the mechanically-operated oil pump 70 and the electrically-operated oil pump 72 are held in the stopped state, the electrically-operated oil pump 72 is started after the mechanically-operated oil pump 70 is pre-started. Thus, the oil pressure is beforehand generated by the mechanically-operated oil pump 70, so that the load imposed on the electrically-operated oil pump 72 can be reduced. Therefore, excessive current can be prevented from occurring in the electronic control circuit for the electrically-operated oil pump 72.

Second, the mechanically-operated oil pump 70 is connected to the engine 8 to be driven in response to the operation thereof, whereby the mechanically-operated oil pump 70 is stopped during the stopped state of the engine 8. However, by driving the electrically-operated oil pump 72 at this time, needed oil pressure can be supplied to the regulator valve 76 even when the engine 8 is held in the stopped state. Additionally, since the mechanically-operated oil pump 70 is connected to the engine 8, there is no need to additionally dispose a power source for driving the mechanically-operated oil pump 70, which can avoid increase in the number of components.

Third, the oil pump control means 110 controls the first electric motor M1 to increase the rotation speed NE of the engine 8 connected to the differential portion 11 in the power transmissive state, to thereby drive the mechanically-operated oil pump 70. Therefore, the mechanically-operated oil pump 70 can be driven without driving the engine 8, which can suppress the fuel consumption by driving the engine 8. Additionally, the mechanically-operated oil pump 70 can be promptly started by the first electric motor M1.

Fourth, the oil pressures generated by the mechanically-operated oil pump 70 and by the electrically-operated oil pump 72 are supplied to the regulator valve 76 shared by these oil pumps 70 and 72. Thus, the regulator valve 76 can be driven by either of these oil pumps. For this reason, the regulator valve 76 is driven by the mechanically-operated oil pump 70 before starting the electrically-operated oil pump 72, which reduces the load imposed on the electrically-operated oil pump 72.

Fifth, driving the regulator valve 76 can regulate the oil pressure supplied to the hydraulic control circuit 42 suitably.
<Modifications>

Although the embodiment of the present invention has been described in detail with reference to the attached drawings, the present invention can be embodied in other modes.

For example, in the above-mentioned embodiment, when the starting requirement of the electrically-operated oil pump 72 is determined in the engine stopped state, the oil pump control means 110 performs the control. In addition to this mode, for example, a means for determining performance of this control in accordance with the oil temperature of operation oil may be added. Specifically, since the operation oil viscosity is high in the low oil temperature, the effect obtained by this control becomes great.

However, since the operation oil viscosity is low in the high oil temperature, the load imposed on the electrically-operated oil pump 72 becomes comparatively small. Therefore, great advantageous effect cannot be obtained even if this control is performed. In contrast thereto, the oil pump control means 110 can perform its operation more efficiently by adding control performance determining means for determining performance of this control in accordance with the oil temperature of operation oil.

In the above-mentioned embodiment, a determining means can be added which prohibits, when the charge capacity SOC of the battery 60 is lower than a predetermined value, starting of the mechanically-operated oil pump 70 by the first electric motor M1.

Additionally, in the above-mentioned embodiment, the second electric motor M2 is connected directly to the power transmitting member 18. However, without allowing the connection position of the second electric motor M2 to be limited to this, the second electric motor M2 may be connected directly to the power transmitting path between the differential portion 11 and the drive wheel 34 or indirectly through, for example, the transmission thereto.

In the illustrated embodiment set forth above, while the differential portion 11 is configured to function as the electrically controlled continuously variable transmission in which the speed ratio γ0 is continuously varied from the minimal value γ0min to the maximal value γ0max, the present invention may be applied even to a case wherein the speed ratio γ0 of the differential portion 11 is not continuously varied but pretended to vary step-by-step with the use of a differential action.

With the power distribution mechanisms 16 of the illustrated embodiments, the first carrier CA1 is connected to the engine 8; the first sun gear S1 is connected to the first electric motor M1; and the first ring gear R1 is connected to the power transmitting member 18. However, the present invention is not necessarily limited to such connecting arrangement, and the engine 8, first electric motor M1 and power transmitting member 18 have no objection to be connected to either one of the three elements CA1, S1 and R1 of the first planetary gear set 24.

Although the illustrated embodiment has been described with reference to the engine 8 directly connected to the input shaft 14, these component parts may suffice to be operatively connected via, for instance, gears, belts or the like. No need may arise for the engine 8 and the input shaft 14 to be necessarily disposed on a common axis.

Further, while the illustrated embodiment has been described with reference to the first electric motor M1 and the second electric motor M2 wherein the first electric motor M1 is coaxially disposed with the drive apparatus input shaft 14 and connected to the first sun gear S1 upon which the second electric motor M2 is connected to the power transmitting member 18. However, no need arises for these component parts to be necessarily placed in such connecting arrangement. For example, the first electric motor M1 may be connected to the first sun gear S1 through gears, a belt or the like, and the second electric motor M2 may be connected to the power transmitting member 18.

In the illustrated embodiment, further, the hydraulic-type frictionally coupling devices such as the first and second clutches C1, C2 may include magnetic type clutches such as powder (magnetic powder) clutches, electromagnetic clutches and meshing type dog clutches, and electromagnetic type and mechanical coupling devices. For instance, with the electromagnetic clutches being employed, the hydraulic control circuit 70 may not include a valve device for switching hydraulic passages and may be replaced with a switching device or electromagnetically operated switching device or the like that are operative to switch electrical command signal circuits for electromagnetic clutches.

While the illustrated embodiment has been described above with reference to the automatic transmission portion 20 that is connected to the differential portion 11 in series via the power transmitting member 18, a countershaft may be provided in parallel to the input shaft 14 to allow the automatic transmission portion 20 to be coaxially disposed on an axis of the countershaft. In this case, the differential portion 11 and the automatic transmission portion 20 may be connected to each other in power transmitting capability via a set of transmitting members structured of, for instance, a counter-gear pair acting as the power transmitting member 18, a sprocket and a chain.

Further, the power distributing mechanism 16 of the illustrated embodiment may include, for instance, a differential gear set in which a pinion, rotatably driven with the engine, and a pair of bevel gears, held in meshing engagement with the pinion, are operatively connected to the first electric motor M1 and the power transmitting member 18 (second electric motor M2).

The power distributing mechanism 16 of the illustrated embodiment having been described above as including one set of planetary gear units, may include two or more sets of planetary gear units that are arranged to function as a transmission having three or more speed positions under a non-differential state (fixed shifting state). In addition, the planetary gear unit is not limited to the single-pinion type, but may be of a double-pinion type.

Following structure can be adopted. When the power distributing mechanism 16 is comprised of two or more sets of planetary gear units, the engine 8, first and second electric motors M1 and M2, and power transmitting member 18 can be connected to each of rotary elements of the planetary gear units in the power transmissive state. Further, the step variable shifting and the continuously variable shifting state can be switched by controlling the clutch C and brake B connected to each of rotary elements of the planetary gear unit.

In the illustrated embodiment, although the engine 8 and the differential portion 11 are directly connected with each other, such connecting mode is not essential. The engine 8 and the differential portion 11 can be connected via the clutch etc.

In the illustrated embodiment, the differential portion 11 and the automatic shifting portion 20 are connected to each other in series. However, the present invention can be applied to a structure even if the differential portion 11 and the automatic shifting portion 20 are mechanically independent from each other, provided that a whole of the shifting mechanism 10 has a function to achieve an electrically controlled differential action, and a function to perform a shifting on a principle different from the function of the electrically controlled differential action. Also the connecting position and the connecting arrangement of the differential portion 11 and the automatic shifting portion 20 are not necessarily limited. Further, the present invention can be applied to the shifting mechanism which has the functions to perform an electrically controlled differential action and a shifting action, even if a part of structure is overlapped or a whole of structure is common.

In the illustrated embodiment, the automatic shifting position 20 adopts a step-variable transmission which enables to have four speed positions. However, the gear shift position of the automatic shifting portion 20 is not limited to four speed positions, but may be to five speed positions or the like. Further, the connecting arrangement of the automatic shifting position 20 is not limited to that in the illustrated embodiment, but may be changed freely.

The foregoing merely illustrates the embodiments for illustrating the principles of the present invention. It will be appreciated by those skilled in the art that various modifications and alternatives to those details could be developed in the light of the overall teachings of the disclosure.

What is claimed is:

1. A hydraulic control device for a vehicular hydraulic control circuit that includes a mechanically-operated oil pump and an electrically-operated oil pump, the hydraulic control device comprising:
   an oil pump control portion that operates, when the electrically-operated oil pump starts from a state in which both the mechanically-operated oil pump and the electrically-operated oil pump are stopped, to drive the mechanically-operated oil pump in advance for a predetermined time period and then to start the electrically-operated oil pump.

2. The hydraulic control device for vehicular hydraulic control circuit according to claim 1, wherein
   the mechanically-operated oil pump is connected to an internal combustion engine provided in a vehicle to be driven in association with the internal combustion engine.

3. The hydraulic control device for vehicular hydraulic control circuit according to claim 1, wherein
   the vehicle further includes an electrically-operated differential portion in which a differential state of rotary elements of a differential mechanism is controlled by controlling an operational state of an electric motor connected to the rotary element,
   the internal combustion engine is connected to the electrically-operated differential portion in a power transmissive state, and
   the oil pump control means operates to control the electric motor to increase a rotation speed of the internal combustion engine for thereby driving the mechanically-operated oil pump.

4. The hydraulic control device for vehicular hydraulic control circuit according claim 1, wherein an oil pressure generated by the mechanically-operated oil pump and an oil pressure generated by the electrically-operated oil pump are both supplied to common variable load means.

5. The hydraulic control device for vehicular hydraulic control circuit according to claim 4, wherein
the variable load means is a regulator valve.

6. The hydraulic control device for vehicular hydraulic control circuit according to claim 1, wherein
the oil pump control portion operates to (i) stop the electrically-operated oil pump in an engine running mode in which the mechanically-operated oil pump is driven by an engine of a vehicle, and (ii) drive the electrically-operated oil pump in a motor running mode in which the mechanically-operated oil pump is not driven by the engine.

7. The hydraulic control device for vehicular hydraulic control circuit according to claim 6, further comprising:
an engine stop determining portion that determines a stopped state of the engine; and
an electrically-operated oil pump start requirement determining portion that determines a starting requirement of the electrically-operated oil pump.

8. The hydraulic control device for vehicular hydraulic control circuit according to claim 6, further comprising:
a determining portion that determines performance by the oil pump control means based on a temperature of an operation oil.

\* \* \* \* \*